(12) United States Patent
Delfosse et al.

(10) Patent No.: US 12,271,784 B2
(45) Date of Patent: Apr. 8, 2025

(54) SHORT-DEPTH SYNDROME EXTRACTION CIRCUITS IN 2D QUANTUM ARCHITECTURES FOR HYPERGRAPH PRODUCT CODES

(71) Applicant: Microsoft Technology Licensing, LLC, Redmond, WA (US)

(72) Inventors: Nicolas Guillaume Delfosse, Bellevue, WA (US); Maxime Tremblay, Sherbrooke (CA); Michael Edward Beverland, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1044 days.

(21) Appl. No.: 17/219,331

(22) Filed: Mar. 31, 2021

(65) Prior Publication Data

US 2022/0198311 A1    Jun. 23, 2022

Related U.S. Application Data

(60) Provisional application No. 63/130,115, filed on Dec. 23, 2020.

(51) Int. Cl.
   *G06N 10/70*   (2022.01)
   *G06F 11/10*   (2006.01)
   *G06F 16/901*  (2019.01)

(52) U.S. Cl.
   CPC ........ *G06N 10/70* (2022.01); *G06F 11/1044* (2013.01); *G06F 11/1048* (2013.01); *G06F 16/9024* (2019.01)

(58) Field of Classification Search
   CPC ........ G06N 10/00; G06N 10/20; G06N 10/40; G06N 10/60; G06N 10/70; G06N 10/80
   See application file for complete search history.

(56) References Cited

U.S. PATENT DOCUMENTS

| 9,286,154 B2 | 3/2016 | Ashikhmin |
| 9,762,262 B2 | 9/2017 | Ashikhmin |

(Continued)

OTHER PUBLICATIONS

Li et al., "A Numerical Study of Bravyi-Bacon-Shor and Subsystem Hypergraph Product Codes", Feb. 2020, ArXiv, pp. 1-11 (Year: 2020).*

(Continued)

*Primary Examiner* — Paulinho E Smith
(74) *Attorney, Agent, or Firm* — Holzer Patel Drennan

(57) ABSTRACT

A quantum measurement circuit implements a hypergraph product code (HPG). A syndrome can be extracted from the circuit by preparing a readout qubit of the quantum measurement circuit in a known state, preparing a row-based measurement gadget, and preparing a column-based measurement gadget in the quantum measurement circuit. The row-based measurement gadget entangles the readout qubit with a first subset of the target set of data qubits in a same row of the quantum measurement circuit as the readout qubit, and the column based gadget entangles the readout qubit with a second subset of the target set of data qubits in a same column of the quantum measurement circuit as the readout qubit. The syndrome is extracted by measuring the readout qubit to extract the parity of the target set of data qubits.

17 Claims, 12 Drawing Sheets

(56) References Cited

U.S. PATENT DOCUMENTS

| | | | |
|---|---|---|---|
| 10,776,709 B2* | 9/2020 | Shen | B82Y 10/00 |
| 11,736,122 B1* | 8/2023 | Yoder | H03M 13/1125 |
| | | | 714/755 |
| 11,966,817 B1* | 4/2024 | Shutty | G06N 10/00 |
| 2022/0156444 A1* | 5/2022 | Noh | G06F 30/367 |
| 2022/0156622 A1* | 5/2022 | Putterman | G06N 10/40 |
| 2022/0198311 A1* | 6/2022 | Delfosse | G06N 10/00 |
| 2022/0198312 A1 | 6/2022 | Delfosse et al. | |

OTHER PUBLICATIONS

Daraeizadeh et al., "Scalable Realization of Surface Code Quantum Memory by Applying Multi-Qubit Parity Detector Gates", Nov. 22, 2018, ArXiv, pp. 1-36 (Year: 2018).*

Arute, et al., "Quantum Approximate Optimization of Non-Planar Graph Problems on a Planar Superconducting Processor", In Repository of arXiv:2004.04197v2, Jul. 10, 2020, 19 Pages.

Cross, et al., "A Comparative Code Study for Quantum Fault-Tolerance", In Repository of arXiv:0711.1556v1, Nov. 9, 2007, 33 Pages.

Daraeizadeh, et al., "Scalable Realization of Surface Code Quantum Memory by Applying Multi-Qubit Parity Detector Gates", In Repository of arXiv: 1811.09011v1, Nov. 22, 2018, 36 Pages.

Li, et al., "A Numerical Study of Bravyi-Bacon-Shor and Subsystem Hypergraph Product Codes", In Repository of arXiv:2002.06257v1, Feb. 14, 2020, 13 Pages.

"International Search Report and Written Opinion Issued in PCT Application No. PCT/US2021/043278", Mailed Date: Jan. 14, 2022, 12 Pages.

"International Search Report and Written Opinion Issued in PCT Application No. PCT/US2021/043283", Mailed Date: Dec. 3, 2021, 13 Pages.

Tillich, et al., "Quantum LDPC Codes With Positive Rate and Minimum Distance Proportional to the Square Root of the Blocklength", In Proceedings of IEEE Transactions on Information Theory, vol. 60, Issue: 2, Feb. 2014, pp. 1193-1202.

"Non Final Office Action Issued in U.S. Appl. No. 17/219,383", Mailed Date: Apr. 5, 2022, 7 Pages.

"Notice of Allowance Issued in U.S. Appl. No. 17/219,383", Mailed Date: Jul. 26, 2022, 8 Pages.

* cited by examiner

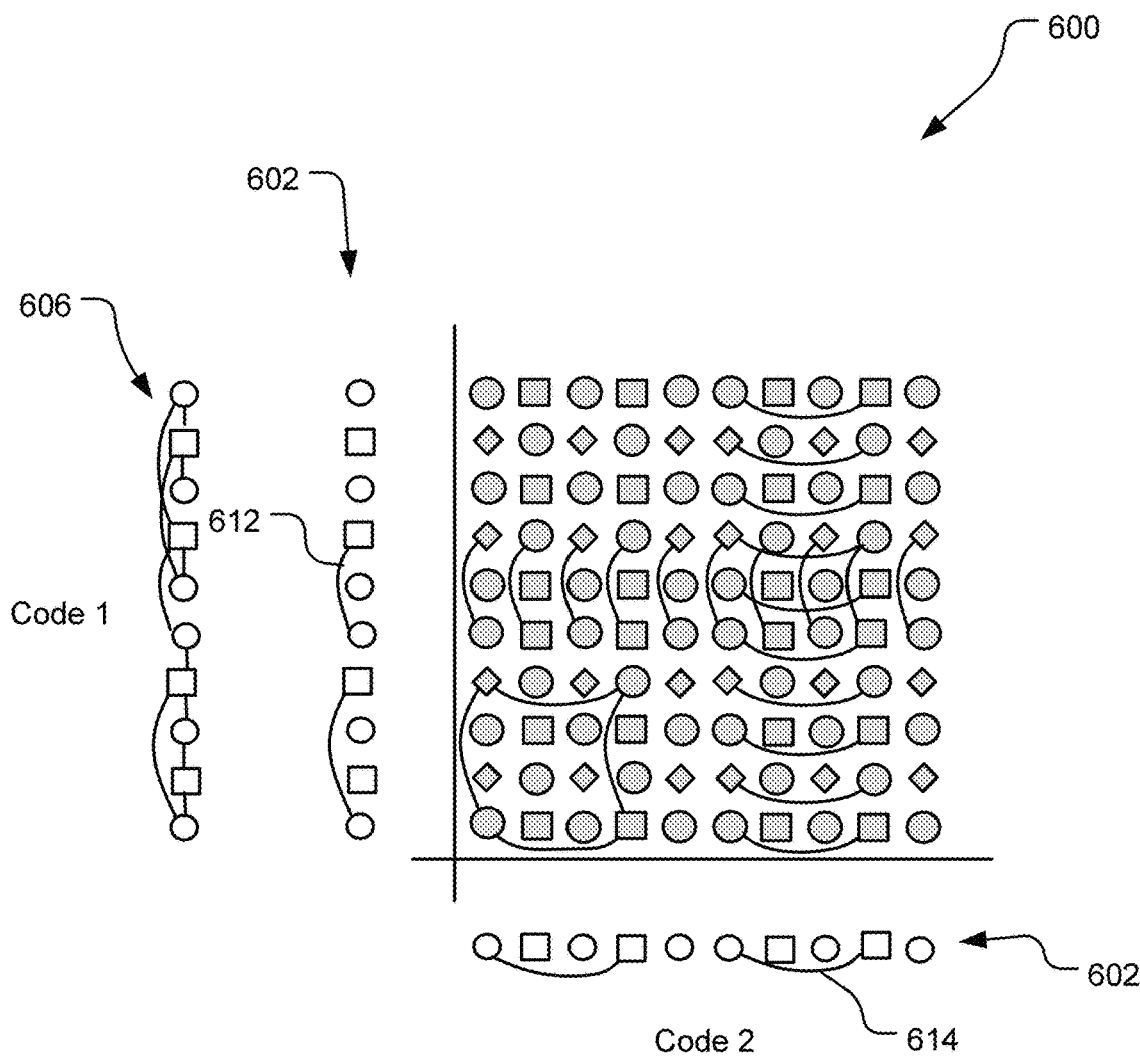
FIG. 6
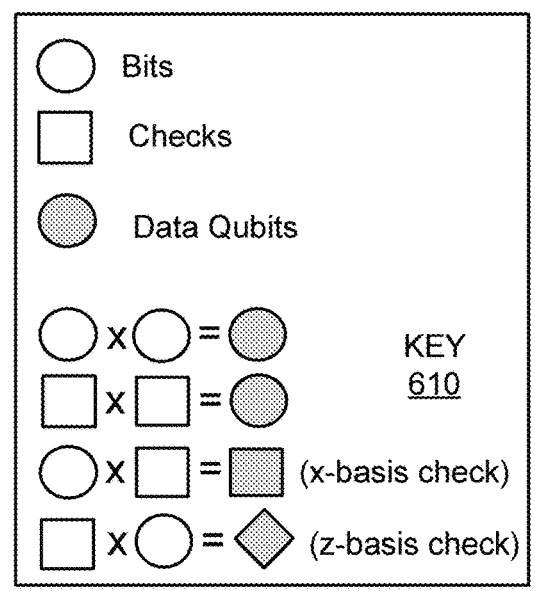

Code 1

Code 2

Exemplary Measurement of Stabilizer located at F4

SHORT-DEPTH SYNDROME EXTRACTION CIRCUITS IN 2D QUANTUM ARCHITECTURES FOR HYPERGRAPH PRODUCT CODES

CROSS-REFERENCE TO RELATED APPLICATIONS

The present application claims priority to U.S. provisional application No. 63/130,115, entitled "Short-Depth Syndrome Extraction Circuits for Quantum Codes," and filed on Dec. 23, 2020, which is hereby incorporated by reference for all that it discloses or teaches.

BACKGROUND

The scalability of decoders for quantum error correction is an ongoing challenge in generating practical quantum computing devices. Hundreds or thousands of high-quality qubits with a very low error rate (e.g., $10^{-10}$ or lower) may be needed to implement quantum algorithms with industrial applications. Using current quantum technologies, these specifications cannot be met without using thousands of high-quality qubits that are each individually encoded in thousands of physical qubits such that there may exist millions of qubits running each computation of the quantum computer. Obtaining error rates currently required by industrial applications requires correcting, at regular intervals, errors that accumulate over these millions of qubits. Detecting and correcting these errors entails processing a massive amount of data, leading to significant challenges in bandwidth and hardware resource allocation.

Hypergraph product (HPG) codes are a type of error correction code derived by taking the product of two different linear codes. This class of codes is promising for quantum error correction because HPG codes are known to achieve a large minimum distance, which translates to a good error correction performance, are defined by low weight checks, which make it easier to measure the syndrome of these codes, and because they offer lower overhead—meaning, many logical qubits can be encoded together in a same data block. In general, however, hypergraph product codes do not have a planar (2D) structure. Therefore, it is challenging to implement hypergraph product codes in a 2D grid of qubits with local interaction.

SUMMARY

According to one implementation, a method for extracting a syndrome from a quantum measurement circuit implementing a hypergraph product code (HPG) includes preparing a readout qubit of the quantum measurement circuit in a known state. The readout qubit corresponds to a check qubit in the hypergraph product (HPG) code that is used in a stabilizer measurement to measure parity of an associated target set of data qubits. The method further includes preparing a row-based measurement gadget in the quantum measurement circuit and preparing a column-based measurement gadget in the quantum measurement circuit. The row-based measurement gadget entangles the readout qubit with a first subset of the target set of data qubits in a same row of the quantum measurement circuit as the readout qubit, and the column-based measurement gadget entangles the readout qubit with a second subset of the target set of data qubits in a same column of the quantum measurement circuit as the readout qubit. The method further provides for measuring the readout qubit to extract the parity of the target set of data qubits.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTION OF THE DRAWINGS

FIG. 6 illustrates an exemplary construction of a product graph representing an HPG code formed by multiplying together two linear CSS codes.

DETAILED DESCRIPTION

Measuring error in quantum circuits entails what is referred to as "syndrome extraction" or the measurement of an array of qubits that provide information about the location of faults (qubit errors) that have occurred during quantum computations. Syndrome extraction is performed via a mechanism known as the "syndrome extraction circuit," which refers to a sequence of quantum operations (e.g., gates or joint parity measurements) that are collectively effective to extract the syndrome. Using currently available syndrome extraction circuits, the "depth" of the syndrome extraction circuit—e.g., the number of time-separated quantum operations or groups of such operations requisite to extract a syndrome—typically grows in proportion to the correction power of the particular error correction code employed.

There herein disclosed technology provides a novel syndrome extraction methodology that is mathematically proven to be of a shortest depth (e.g., having a fewest number of measurement rounds) for a particular class of error corrections codes known as hypergraph product (HPG) codes. Specifically, the herein disclosed circuit extraction methodology is implementable in quantum circuits that provide local 2D connectivity. As used herein, a quantum circuit is said to provide local 2D connectivity when the circuit includes a 2D grid of qubits that limits multi-qubit operations (e.g., gates) to pairs of nearest-neighboring qubits. In contrast, a quantum circuit that offers "full connectivity" is one that includes a physical connection between every pair of qubits in the grid such that a gate may be applied directly to affect any qubit pair without affecting other qubits. Currently, many error correction codes are considered theoretically with respect to fully connective qubit circuits; in practice, however, fully connected qubit grids do not yet exist. Thus, quantum error correction solutions implementable on grids with local 2D connectivity are considered more practical for implementation in near-term industry developments.

Figure 1:
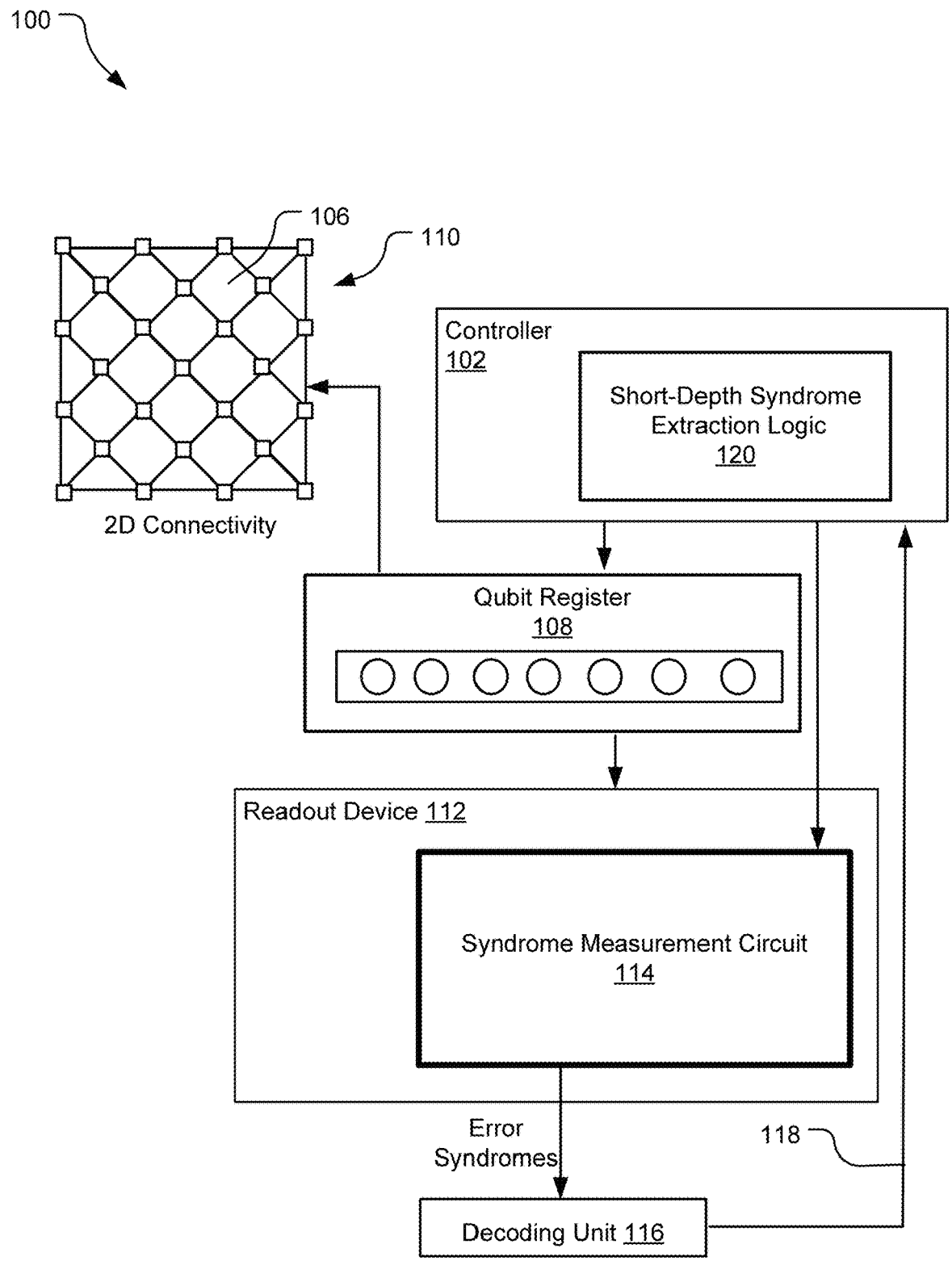
FIG. 1 illustrates an example quantum computing system that uses a short-depth syndrome extraction circuit to measure a syndrome of a quantum measurement circuit implementing a HPG code.

FIG. 1 illustrates an example quantum computing system 100 that uses a short-depth syndrome extraction circuit to measure a syndrome of a quantum measurement circuit implementing a HPG code. The quantum computing system 100 includes a controller 102 that performs calculations by manipulating qubits within a qubit register 108. The controller 102 includes logic for executing quantum algorithms via such manipulations and for controlling a readout device 112 to extract information about the locations of faults (errors) affecting qubit states during quantum measurements. Specifically, the controller 102 includes short-depth syndrome extraction logic 120 for generating control signals to command the readout device 112 to repeatedly extract an error syndrome (array of qubits and zeros) by implementing a syndrome measurement circuit 114 within the readout device 112.

The syndrome measurement circuit 114 enables fault-tolerant quantum computing by applying a stabilizer code to the qubits in the qubit register 108. Since measurement is known to destroy the delicate states of a qubit needed for computation, the syndrome measurement circuit 114 uses redundant qubits—known as "ancilla data qubits" to perform computations. During quantum processing, entropy from the data qubits that encode the protected data is transferred to the ancilla qubits that can be discarded. The ancilla qubits are positioned to interact with data qubits such that it is possible to detect errors by measuring the ancilla qubits and to correct such errors using a decoding unit 116 that includes one or more decoders. In some implementations, the decoding unit 116 includes logic executed by one or more classical computing systems.

The syndrome measurement circuit 114 performs measurements of the ancilla qubits in the quantum computer to extract syndromes providing information measured with respect to errors (faults). In order to avoid accumulation of errors during the quantum computation, the syndrome data is constantly measured, producing r syndrome bits for each syndrome measurement round. In one implementation, the syndrome data is measured with a frequency of every 1 μs. Other implementations may measure the syndrome more frequently, such as every 1 ns.

The repeatedly-measured syndrome data is used to identify and track locations of faults that occur throughout a quantum operation that spans several individual qubit manipulations. At the termination of the quantum operation, the measurement circuit performs a final measurement that disentangles one qubit from the others in the syndrome measurement circuit 114, and this qubit is read out as a final solution (a 1 or 0 value). By using the syndrome data to track faults in each round of the quantum operation, a classical bit correction can be performed to correct the final solution.

The syndrome measurement circuit 114 extracts each round of the syndrome data by performing sequences of operations known as "stabilizer measurements." In the case of HPG codes—a class within a larger family known as Calderbank Shor Steane (CSS) codes—stabilizer measurements are typically implemented with a particular defined sequence of operations. For example, a CSS code stabilizer may be measured by entangling an ancilla qubit with a group of data qubits and by subsequently measuring the ancilla qubit to observe the resulting state. This entanglement forces the group of neighbor data qubits into an eigenstate of a stabilizer operator (e.g., the X-stabilizer or the Z-stabilizer), allowing one to measure the stabilizers without perturbing the system. When the stabilizer measurement outcomes change, this corresponds to one or more qubit errors in the quantum state that are projected by the measurement. The outcome is either 0 (trivial) or 1. If the outcome of a measurement is 1, this indicates the presence of an error on the data qubits measured. An ancilla qubit that supports a stabilizer measurement in this way is also referred to herein as a "check qubit."

CSS code stabilizer measurements typically entail several time-separated measurement steps, such as those exemplary steps disclosed herein with respect to FIG. 3 below. Traditional solutions typically provide for performing a different, time-separated stabilizer measurement with respect to each check bit within each stabilizer measurement round. For a robust CSS code employing a large number of stabilizers, this results in a syndrome measurement circuit of considerable depth (e.g., long temporal length to implement).

In contrast to these traditional larger-depth stabilizer circuits, the syndrome measurements circuit 114 implements what is referred to herein as a "short-depth" syndrome extraction circuit, meaning that the syndrome measurement circuit 114 can extract each round of syndrome data from the CSS code using a fewer number of time-separated measurement steps that traditional solutions.

At each round of syndrome measurement, the syndrome data is sent to the decoding unit 116, which implements decoding algorithms to analyze the syndrome data and to detect the location of each error and to correct each error on the data qubits.

In decoding applications, a "connectivity graph" $G=(Q,E)$ may be used to specify the hardware layout without the qubit register 108, where each vertex $q \in Q$ corresponds to a qubit. In the presently-disclosed applications, it is assumed that the selected quantum architecture allows for implementation of any Clifford gate, Pauli state preparation, and Pauli measurement on each individual qubit $q \in Q$. It is further assumed that some entangling operation, such as a CNOT gate or a joint measurement, is possible between a pair of qubits q and q' if and only if they are connected by an edge in the graph, i.e., $\{q,q'\} \in E$. In this work, the case considered is one where there exist quantum architectures and corresponding graphs with 2D connectivity, such as the graph shown in view 110. This means that a quantum operation can be performed on any pair of nearest-neighbor qubits in the grid (e.g., qubits connected by a single edge, such as edge 106.

To implement a stabilizer code of block length Nin the proposed hardware, more than just N physical qubits are employed. Rather, the code state is stored in a subset of N of the qubits in the connectivity graph, which are referred to herein as data qubits. In contrast to data qubits, the above-mentioned "ancilla qubits" make up a second set of physical qubits that are used to measure the value of the stabilizers. Ancillas used to measure X-type errors are referred to herein as "X-type check qubits" while ancillas used to measure Z-type errors are referred to herein as "Z-type check qubits."

To implement logic for measuring stabilizers, it is often useful to consider a specific mapping of a type of graph known as the Tanner graph of a code to physical qubits in the connectivity graph using coordinates. An exemplary Tanner is graph is discussed below with respect to FIG. 2.

Figure 2:
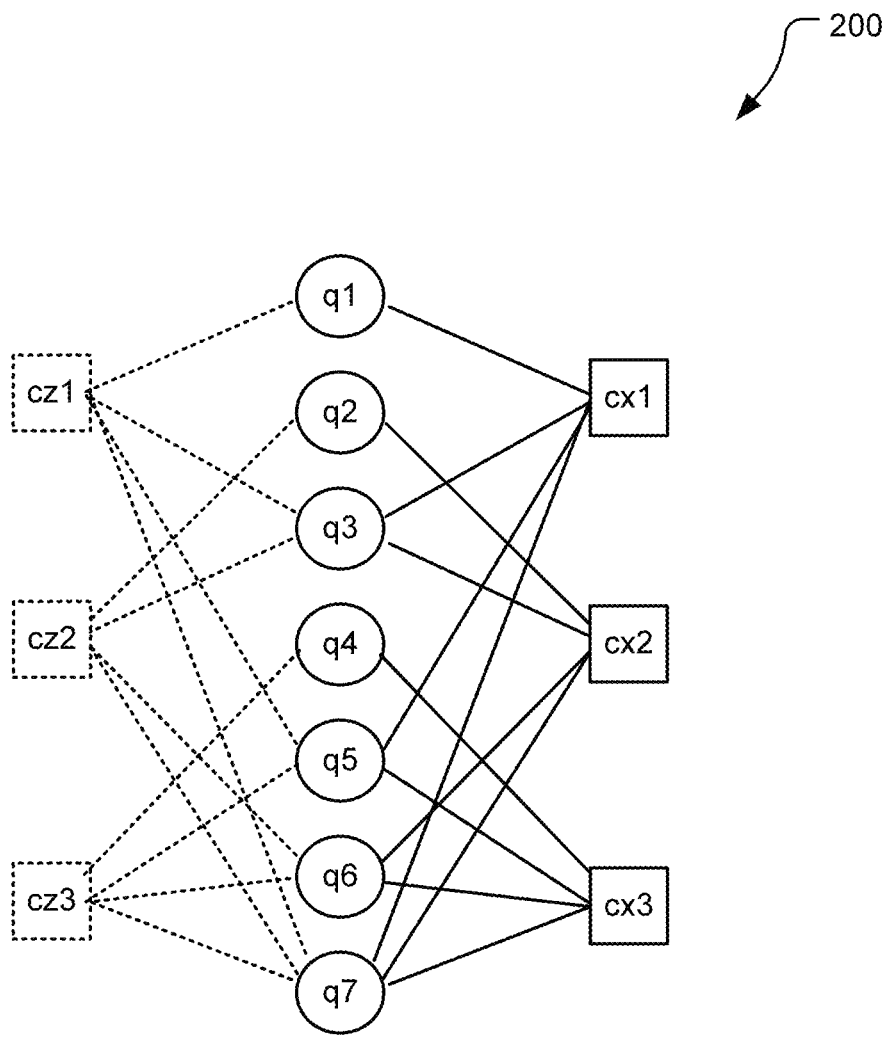
FIG. 2 illustrates an Tanner graph useful in illustrating error decoding principles for a quantum circuit implementing a CSS stabilizer code, such as an HPG code.

FIG. 2 illustrates an Tanner graph 200 useful in illustrating error decoding principles for a quantum circuit implementing a CSS stabilizer code, such as an HPG code. The quantum circuit is said to have a connectivity graph (representing qubit connectivity) with coordinates that correspond to the Tanner graph 200 such that each vertex in the Tanner graph 200 may be understood as corresponding to a qubit at a particular coordinate in the connectivity graph. This assignment of coordinates to the vertices of the Tanner graph 200 is sometimes referred to as "standard coordinates."

The Tanner graph 200 is exemplary of one of many different types of CSS stabilizer codes suitable for implementing the herein disclosed short-depth syndrome extraction methodology. In this example, the particular code illustrated by the Tanner graph 200 is a Steane code that includes check qubits represented by squares, data qubits represented by circles, and connections therebetween represented by edges. Since an actual implementation of the syndrome measurement circuit may include more than 15,000 qubits, the Tanner graph of FIG. 2 is representative of a small portion of the circuit that includes seven data qubits, three X-basis check qubits (cx1, cx2, cx3) and three Z-basis check qubits (cz1, cz2, cz3). The herein disclosed methodologies for measurement of an X-basis syndrome are the same or very similar to the disclosed methodologies for measuring the Z-basis syndrome. For this reason, the following example describes a stabilizer measurement with respect to only an X-basis check qubit.

Measurement of a stabilizer is performed by executing a syndrome extraction circuit, which may be understood as decomposed into a sequence of steps $S_0, S_1, \ldots, S_{\tau-1}$. A step consists of a set of operations allowed by the connectivity graph where each operation in the set has disjoint support and therefore can be implemented simultaneously. In general, two or more qubit operations may be performed on a single step (simultaneously) provided the two operations do not occur on a same edge of the associated connectivity graph (or Tanner graph, which has edges mirroring those of the circuit's connectivity graph). The size of a syndrome extraction circuit is the total number of operations (including idle operations within the circuit), while the depth of syndrome extraction circuit referred to the number of time steps T required to implement the circuit.

Measuring an X-basis syndrome of the portion of the circuit represented by the Tanner graph 200 entails (1) preparation of the X-basis check qubits in a known state; (2) operations to entangle each one of the X-basis check qubits with the neighboring data qubits to which the X-basis check qubit is connected by edges in the Tanner graph 200; and (3) measuring each of the X-basis qubits following these entanglement operations. Performing the above-enumerated operations with respect to the three X-basis check qubits (cx1, cx2, and cx3) is equivalent to measuring three stabilizers (executing three stabilizer circuits) to extract a 3-bit syndrome, where a 0 bit indicates an absence of fault or an even-number of faults on the neighboring data qubits and a 1 bit indicates an odd number of faults on the neighboring data qubits. Complete syndrome extraction typically entails repeating the above-described operations with respect to the Z-basis check qubits.

Figure 3:
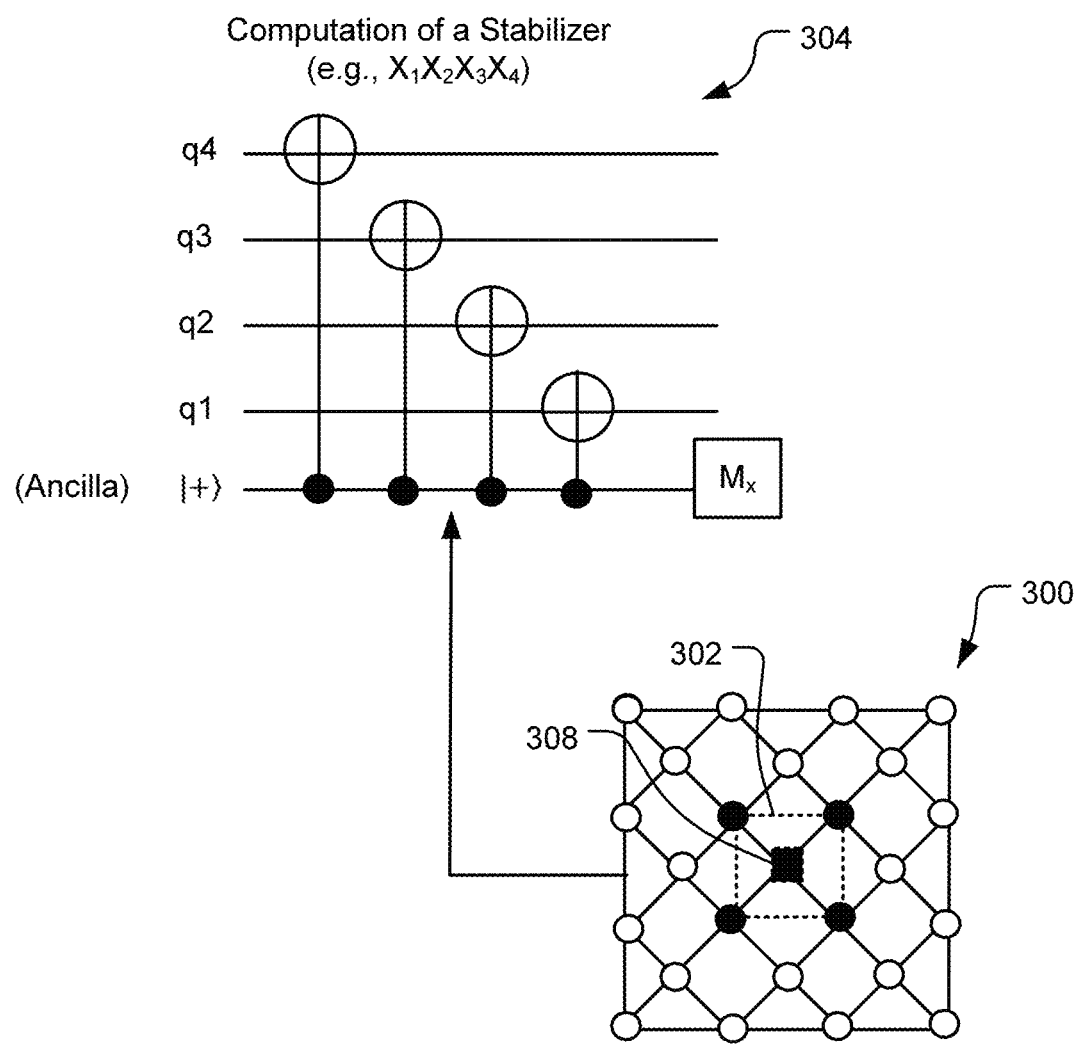
FIG. 3 illustrates an example traditional methodology for measuring an individual stabilizer in a quantum circuit implementing a CSS stabilizer code, such as an HPG code.

FIG. 3 illustrates an example traditional methodology 300 for measuring an individual stabilizer in a quantum circuit implementing a CSS stabilizer code, such as an HPG code. As noted above, extraction of a round of syndrome data entails performing a different stabilizer measurement with respect to each different X-basis and Z-basis check qubit in the measurement circuit.

In some implementations, a stabilizer supported on a set of qubits can be measured by using a single measurement ancilla qubit. FIG. 3 illustrates a specific example of this. In FIG. 3, a stabilizer measurement is performed by entangling a check qubit 308 with its four nearest-neighbor qubits (referred to herein as "target data qubits," shown along a dotted rectangle 302) and by the observing the resulting state of the check qubit 308 via measurement. This measurement of the check qubit 308 allows for observation of the parity of the four nearest-neighbor target data qubits.

Traditionally, this stabilizer measurement is performed by implementing a sequence of operations in a very particular order, which is shown in circuit diagram 304. When performing this stabilizer measurement in the X-basis, this sequence of operations includes preparing the ancilla 308 (the check qubit) by initializing this qubit ground state; performing four sequential (time-separated) CNOT operations, where the CNOTs target each one of the four nearest-neighbor data qubits with the check qubit acting as the control; and finally, performing a projective measurement of the resulting eigenstate $(\hat{X}_a, \hat{X}_b, \hat{X}_c, \hat{X}_d)$ by measuring the check qubit. This single individual stabilizer measurement consists of 6 sequential measurements. Each stabilizer within the CSS code is measured independently.

To measure the syndrome of the three X-basis check qubits shown in FIG. 2 (above), this process entails 18 total time-separated measurement steps (e.g., 6 steps for each one of the three stabilizer measurements). Notably, this methodology provides for a number of measurement steps that is proportional to the number of check qubits in a given circuit.

Notably, the CNOT-based stabilizer readout strategy requires the ability to perform a CNOT between the measurement ancilla qubit and each data qubit in the support of the operator. However, this may not be possible depending on the connectivity graph corresponding to the particular quantum hardware employed. Another strategy for implementing a stabilizer measurement is therefore to use extra ancillas, referred to as "bridge ancilla qubits" in addition to the readout ancilla qubit to help with the measurement using a cat state circuit. An example of a stabilizer measurement using a cat state circuit is provided in FIG. 4.

Figure 4:
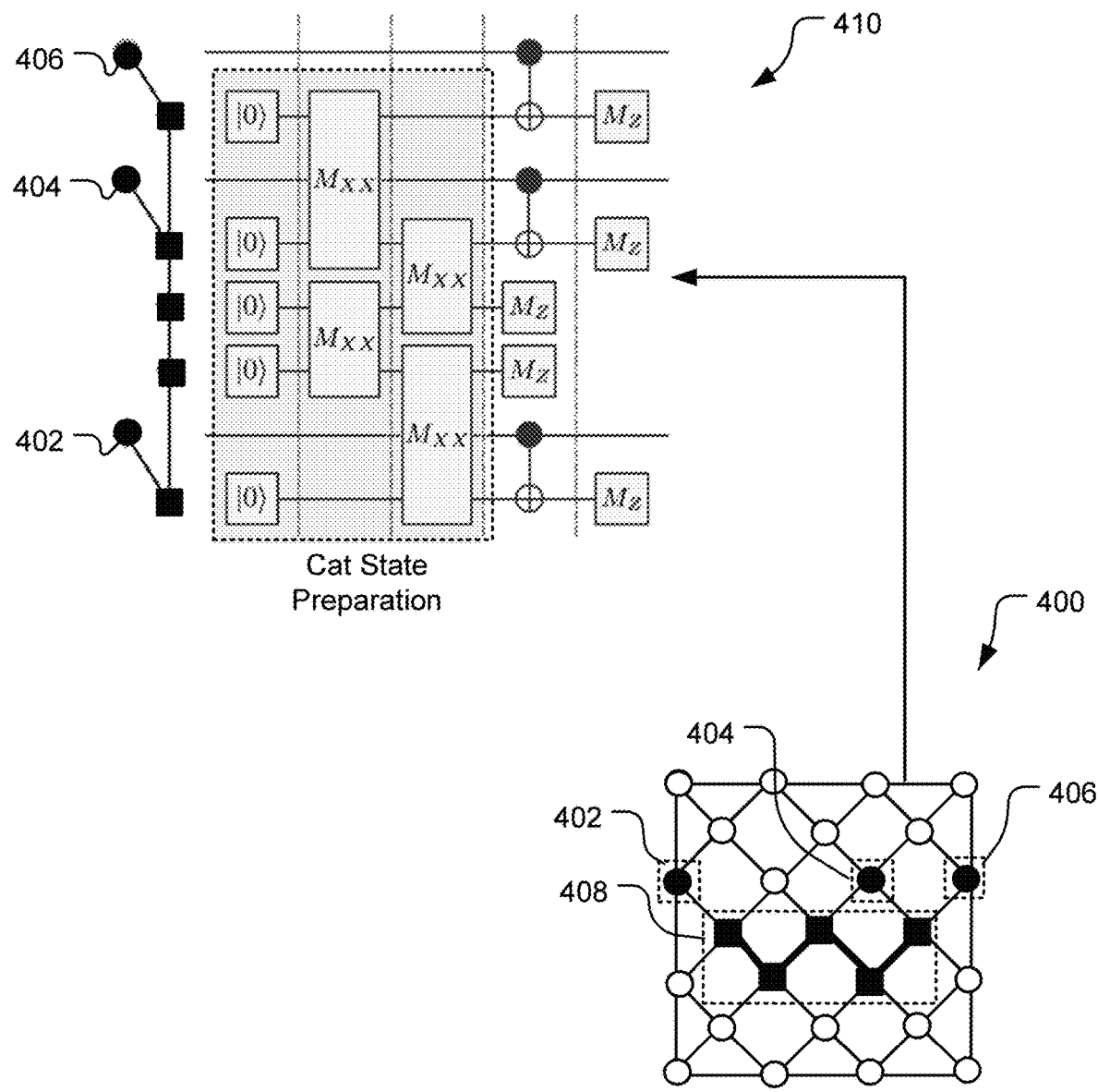
FIG. 4 illustrates an example of a stabilizer measurement in a 2D qubit grid that uses bridge ancilla qubits to form a cat state.

FIG. 4 illustrates an example of a stabilizer measurement in a 2D qubit grid 400 that uses bridge ancilla qubits to form a cat state. Circuit diagram 410 illustrates operations of a stabilizer measurement effective to measure the parity of a trio of target data qubits, 402, 404, and 406. Since there is no single qubit directly coupled to all three of the target data qubits 402, 404, 406, a line of five qubits (shown in dotted rectangle 408) are selected to serve as "bridge ancilla qubits" to support the stabilizer measurement. In this case, the five bridge ancilla qubits in dotted rectangle 408 are entangled with one another, forming a cat state circuit. Then, the cat state circuit is then entangled with each of the target data qubits 402, 404, 406, and the parity of the data qubits 402, 404, 406 can be extracted from a measurement of select ancillas within the cat state.

A specific methodology for implementing the foregoing is shown with respect to the circuit diagram 410. Note—the left-hand side of the circuit diagram 410 shows an alternate illustration of the five ancilla qubits (squares) and three target data qubits (circles) that are shown with respect to the 2D qubit grid 400. Per this methodology, the five bridge ancilla qubits are prepared in a known state, four different x-basis measurements (Mxx steps) are performed to create the cate state from the bridge ancillas. Following this, three CNOT operations are performed—one CNOT operation to entangle each of the three different data qubits 402, 404, 406 with the cat state. In the illustrated example, the measurement result is extracted by performing a single qubit measurement of each of the five entangled cat state qubits. This allows for a parity determination of the state of the target data qubits without destroying the data stored on such qubits.

In the following disclosure, a cat state circuit used to support a stabilizer measurement (such as in the manner described with respect to FIG. 4) is referred to as a "stabilizer support group." As used herein, the term "stabilizer support group" is used to refer to a group of ancilla qubits that are entangled to form a cat state and subsequently used to measure the parity of a set of target data qubits.

Figure 8A:
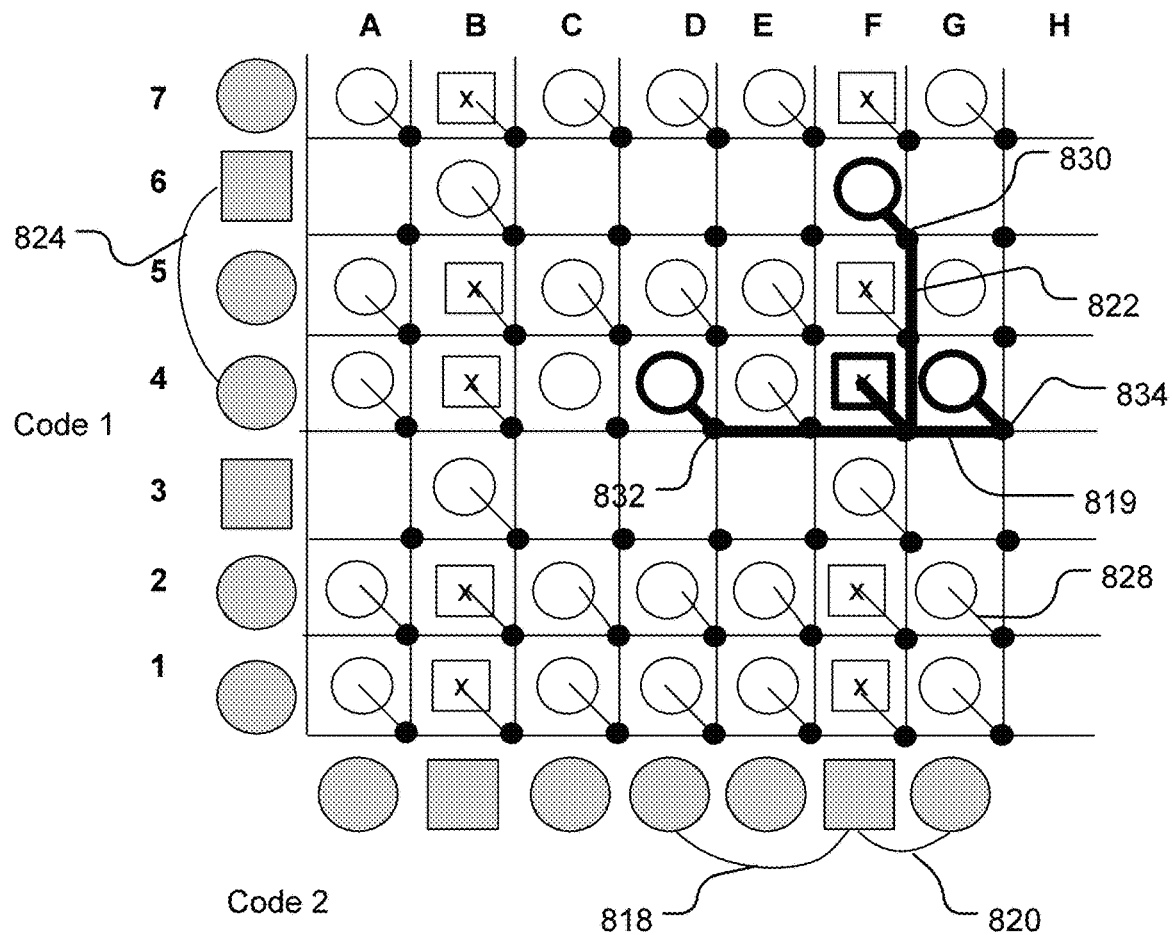
FIG. 8A illustrates example modifications to a product graph representing an HPG code that may facilitate implementation of a particular short-depth syndrome measurement circuit in a quantum measurement circuit implementing the HPG code.
Figure 8A:
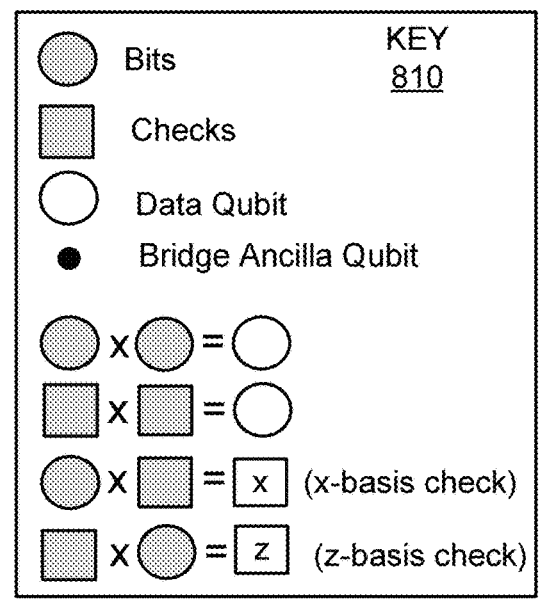
Figure 8B:
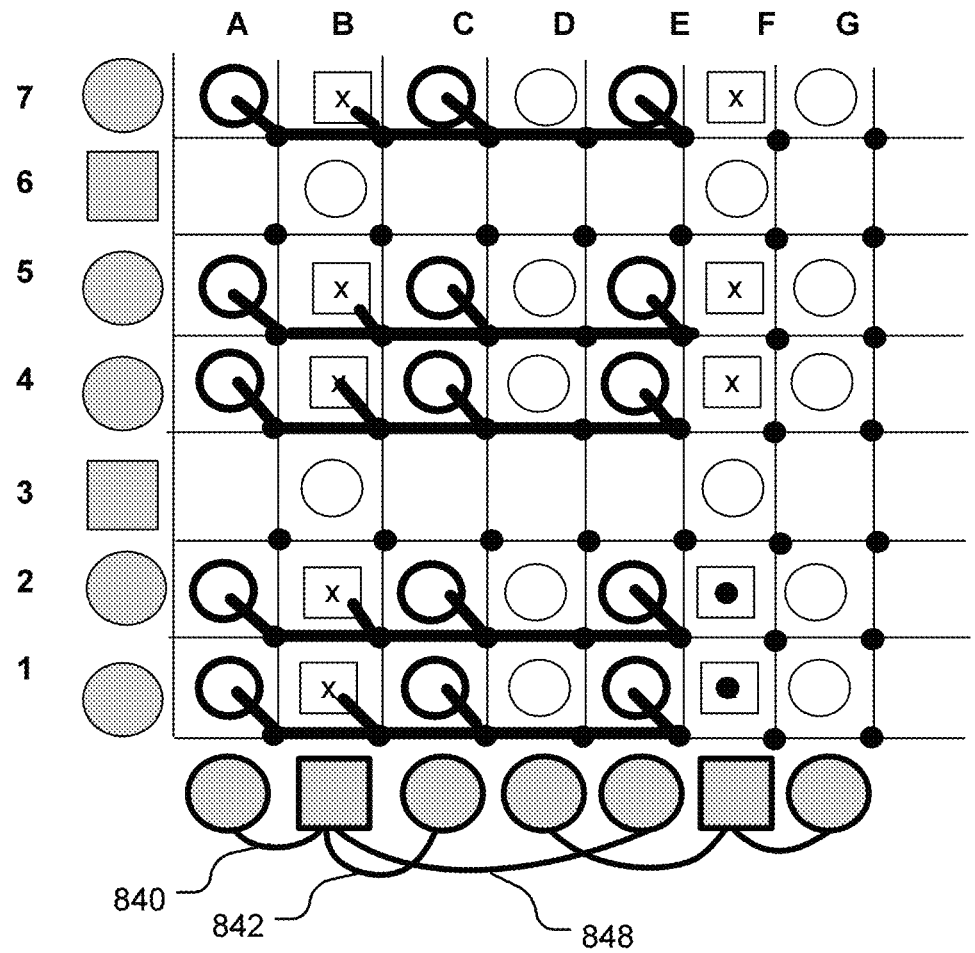
FIG. 8B illustrates a first set of exemplary operations performed by a short-depth syndrome extraction circuit to measure a syndrome of the circuit represented by the product graph of FIG. 8A.
Figure 8C:
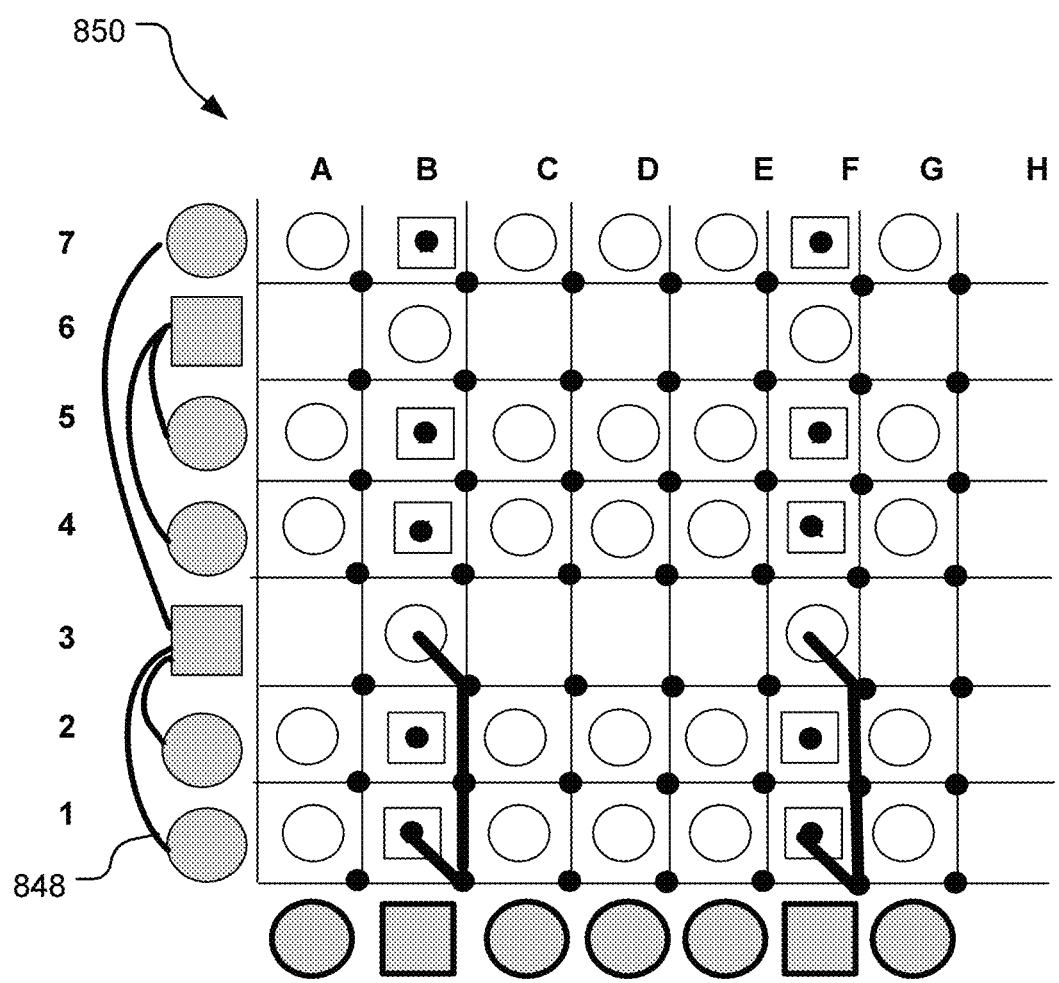
FIG. 8C illustrates another set of exemplary operations performed by a short-depth syndrome extraction circuit to measure a syndrome of the circuit represented by the product graph of FIGS. 8A and 8B.

A specific HPG code syndrome extraction circuit disclosed with respect to FIG. 8A-8C uses various stabilizer support groups to concurrently measure multiple stabilizers and thereby extract a syndrome measurement.

Figure 5:
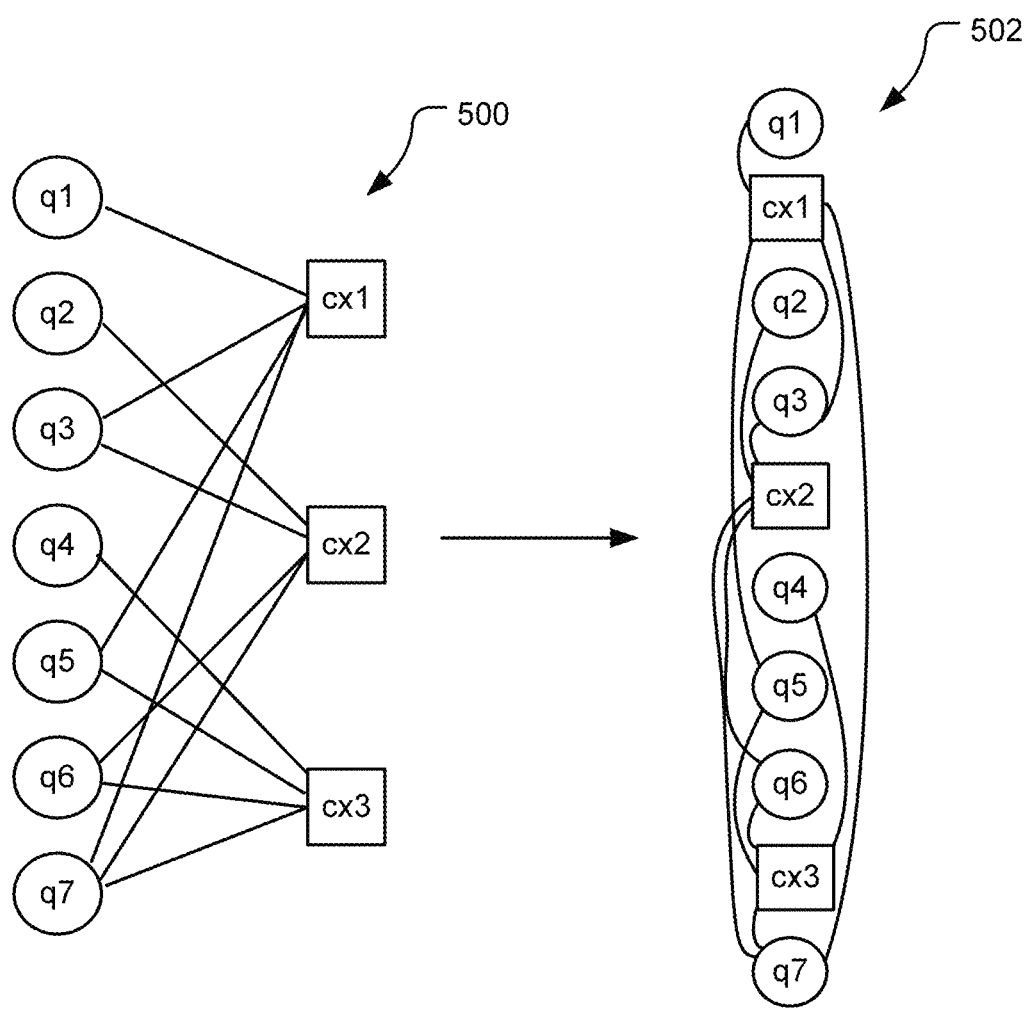
FIG. 5 introduces another notation for a Tanner graph useful in illustrating a methodology for extracting a syndrome from 2D quantum circuit implementing a hypergraph product code.

FIG. 5 introduces another notation for a Tanner graph 500 (as a modified graph 502) useful in illustrating a methodology for extracting a syndrome from 2D quantum circuit implementing a hypergraph (HPG) product code. As shown in FIG. 5, the Tanner graph 500 can be visually condensed into a 1D line of data qubits (circles) and check qubits (squares) as shown in modified graph 502. Linear codes of the form shown by the 1D line in the modified graph 502 may be used as the X and Y axis of the graphs shown and discussed below with respect to FIG. 6.

FIG. 6 illustrates an exemplary construction of a product graph 600 representing an HPG code formed by multiplying together two linear CSS codes, shown along the y-axis 602 and x-axis 604 as "Code 1" and "Code 2" respectively. Table 1.0, below, includes a formal definition of a HPG code.

TABLE 1.0

Definition: Hypergraph Product

Given the Tanner graphs T = (V, E) and T' = (V', E'), the cartesian product T × T' is the graph (V × V', $\bar{E}$) with
$\bar{E}$ =
(v, v'$_a$), (v, v'$_b$)v ∈ E, v'$_a$, v'$_b$ ∈ E' ∪
(v$_a$, v'), (v$_b$, v')v$_a$, v$_b$ ∈ E, v' ∈ E'.
From this, we can define hypergraph product codes.
Consider two linear codes and ' with Tanner graphs T = (V, E) and T' = (V', E') where V = B ∪ C and V' = B' ∪ C'. Let (Q, S$_X$, S$_Z$) be a partition of the cartesian product T × T' = (V × V', $\bar{E}$), such that
• (v, v') ∈ Q if v ∈ B and v' ∈ B' or v ∈ C and v' ∈ C';
• (v, v') ∈ S$_X$ if v ∈ B and v' ∈ C';

TABLE 1.0-continued

Definition: Hypergraph Product

• (v, v') ∈ S$_Z$ if v ∈ C and v' ∈ B'.
The hypergraph product (, ') is the CSS code with Tanner graphs T$_X$ and T$_Z$ respectively spanned by Q ∪ S$_X$ and Q ∪ S$_Z$.

In FIG. 6, each of the two linear CSS codes consists of multiple check bits (squares) and data bits (circles), using the same notation shown introduced in FIG. 5 (e.g., the modified graph 502). For simplicity of illustration, only a subset of the edges within each graph are shown in the y-axis 602 and the x-axis 604. For example, all edge of code one are shown in a first representation 606 but several are redacted for simplicity in a second representation shown along the y-axis 602.

The product graph 600 is created by multiplying the two classical linear codes (Code 1, Code 2) together. Visually, this can be understood by depicting a Tanner graph for Code 1 along the Y-axis and a Tanner graph for Code 2 along the X-axis, as shown. A node multiplication step is performed in which each node on the X-axis is multiplied by each node on the Y-axis according to a particular product definition methodology shown in key 610 of FIG. 6, also described as follows:
   a data bit (circle) multiplied by a data bit (circle) yields a data qubit (circle);
   a check bit (square) multiplied by another check bit (square) yields a data qubit (circle);
   a data bit (circle) multiplied by a check bit (square) yields an X-basis check qubit (sometimes referred to as a "measure-X qubit"0; and
   a check bit (square) multiplied by a data bit (circle) yields a Z-basis check qubit (sometimes referred to as a "measure-Z qubit").

Similar to the multiplicative methodology applied to the check bits and data qubits, the edges of Code 1 and Code 2 are also multiplied across each row and column of the product graph 600. For example, a vertical edge 612 is added at a like-position in every column of the table, while a horizontal edge 614 is added at a like-position in every row of the table. Other edges of the product graph 600 are redacted in FIG. 6 for simplicity and clarity of illustration.

Figure 7A:
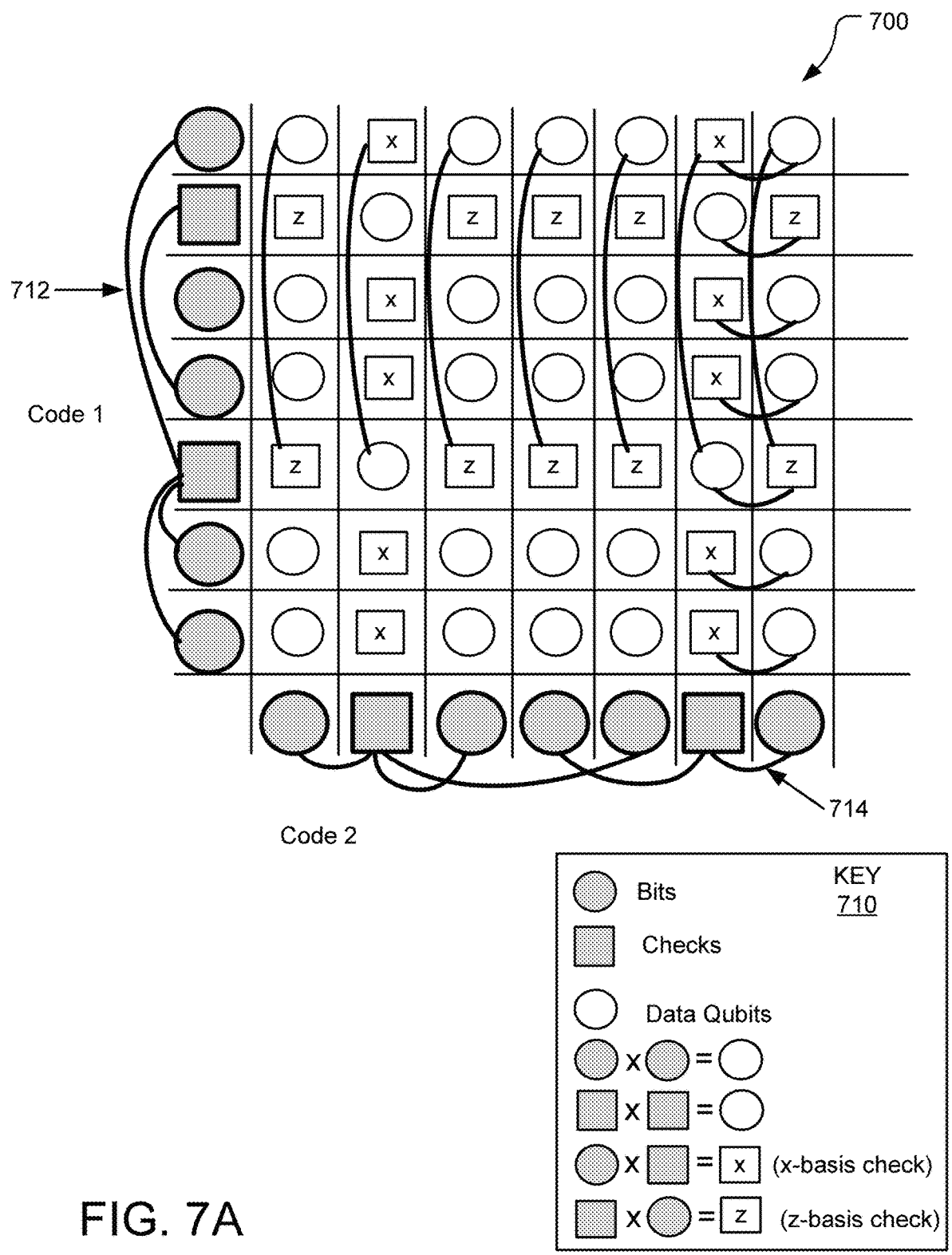
FIG. 7A illustrates a first set of exemplary operations for building a product graph for an HPG code that may be implemented in a 2D quantum measurement circuit.
Figure 7B:
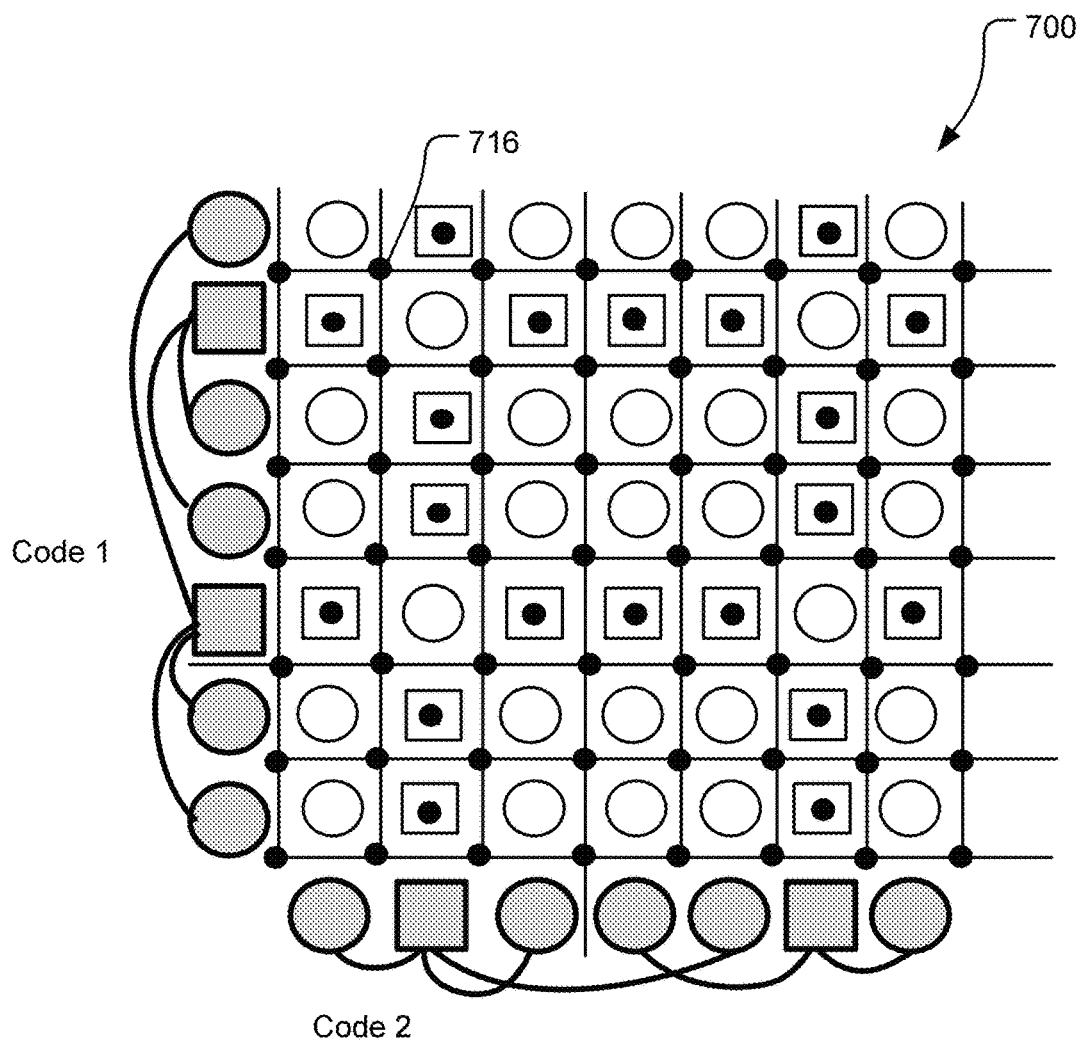
FIG. 7B illustrates example modifications to the product graph of FIG. 7A that may be performed to facilitate implementation of an HPG code in a 2D quantum measurement circuit.
Figure 7B:
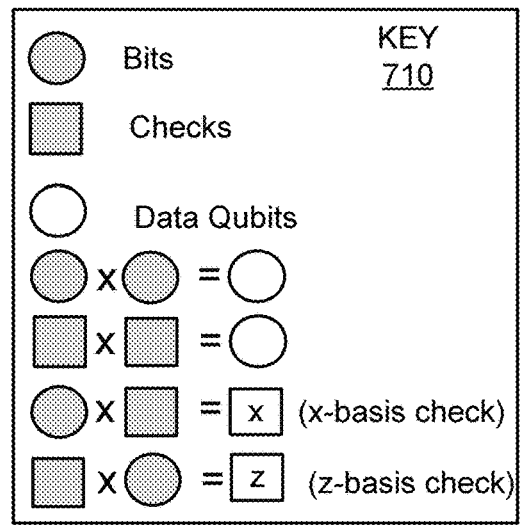

FIG. 7A-7B generally disclose example operations for constructing a 2D graph representing an HPG code. The 2D graph is helpful in constructing a quantum circuit with 2D connectivity capable of implementing the HPG code.

FIG. 7A illustrates a first set of exemplary operations for building a product graph 700 for an HPG code that may be implemented in a 2D quantum measurement circuit. Two linear CSS codes, Code 1 and Code 2 are expressed as linear Tanner graphs and multiplied together in the same or similar manner as that discussed above with respect to FIG. 6. This results in the product graph 700, which is also a form of Tanner graph. The linear CSS codes, Code 1 and Code 2, consist of bits (data qubits), checks (ancilla qubits used to readout stabilizer measurements), and edges indicating connectivity that is supported between bits and checks during a stabilizer measurement.

In a vertex multiplication step, each of the bit and check nodes of Code 1 is multiplied by a node at a corresponding index in Code 2, thereby populating the product graph 700 with data qubits, X-basis checks, and Z-basis checks, per the notation shown in key 710.

In the illustrated operation, edges are populated throughout the product graph 700 by (1) propagating each edge defined within Code 1 across every column in the product graph 700 and (2) propagating each edge defined within the Code 2 across every row in the product graph 700. For illustration of concept, FIG. 7A illustrates the multiplication of a single edge 712 in Code 1 by each column and a single edge 714 in Code 2 by each row. Other edges are assumed to be propagated in the same way but this propagation is not shown for simplicity.

Physical construction of a quantum circuit corresponding to the product graph 700 entails mapping the vertices of the product graph 700 to physical qubits using standard coordinates such that data qubits and check qubits of the product graph 700 each map to a corresponding qubit in the circuit. To ensure support for all operations of the HPG code, the quantum circuit is, in one implementation, further modified to include an overlying a r×r grid of bridge ancilla qubits, as shown in the product graph of FIG. 7B.

FIG. 7B illustrates example modifications to the product graph 700 of FIG. 7A that may be performed to facilitate implementation of an HPG code in a 2D quantum measurement circuit. FIG. 7B illustrates modifications to the product graph 700 of FIG. 7A and the corresponding quantum measurement circuit that facilitate implementation of a particular short-depth syndrome measurement circuit. For simplicity of illustration, edges corresponding to those in Code 1, Code 2 have been omitted from the central portion of product graph 700 (note: the edges are still shown along the axis of the graph). In FIG. 7B, the product graph has been modified include an r×r grid of bridge ancilla qubits between each pair of nearest-neighbor qubits (e.g., a bridge ancilla qubit 716). This grid of ancilla qubits has been added at coordinates $(i+½, j+½)$ for $0≤i, j<r$. Per this construction, we assume that 2-qubit operations are now allowed between pairs of bridge ancillas which are nearest neighbors in this grid. Furthermore, the bridge ancilla qubit at coordinates $(i+½, j+½)$ is connected to the data or readout qubit at coordinates $(i,j)$.

Using these bridge ancilla qubits, it is possible to construct stabilizer support groups (e.g., cat states usable to support stabilizer measurements), similar to the manner described with respect to FIG. 4.

FIG. 8A illustrates example modifications to a product graph 800 representing an HPG code that may facilitate implementation of a particular short-depth syndrome measurement circuit in a quantum measurement circuit implementing the HPG code. The product graph 800 is assumed to have features the same or similar to those in FIGS. 7A-7B and is, in at least one implementation, identical to the product graph construction with respect to FIG. 7A-7B. The product graph 800 is formed by multiplying together two linear CSS codes, Code 1 and Code 2, per the methodology shown in key 810. A grid of ancilla qubits is then overlaid on the resulting product graph, as shown and described with respect to FIG. 7B. For simplicity, the product graph 800 omits the Z-basis checks but still shows the X-basis checks, data qubits, and overlying bridge ancilla qubits. Lead lines (e.g., a lead line 828) have been added to show how each data qubit and x-basis check bit physically connects to an adjacent row of bridge ancilla qubits.

To illustrate the measurement aspects of an individual stabilizer, the product graph 800 omits a majority of the edges in Code 1 and Code 2, illustrating exclusively a select few of the edges 818, 820, and 824 that are used to measure a stabilizer corresponding to an x-basis check bit located at graph position F4.

In the example stabilizer measurement illustrated and described below, the x-basis check bit located at graph position 4F is referred to as the "readout bit" of the stabilizer measurement. The stabilizer measurement is effective to entangle the readout bit with a set of target data qubits, where the set of target data qubits is defined as including a set of data bits connected to the readout bit on the product graph 800 by either a vertical edge (e.g., the vertical edge 824) or a horizontal edge (e.g., horizontal edges 818, 820).

In the illustrated example, where the readout bit for the stabilizer measurement is positioned at F4, it can be noted that—due to the presence of vertical edge 824 in Code 1, the product graph 800 implicitly includes a vertical edge coupling the readout bit at F4 to a data bit at F6. Thus, the data bit at F6 is one of the target data bits of this example stabilizer measurement and said to be "vertically-aligned" with the check bit at F4 because the two bits occupy the same column in the product graph 800. Likewise, due to the presence of horizontal edges 818 and 820 in Code 2, the product graph 800 implicitly includes a first horizontal edge coupling the readout bit at F4 to a data bit at D4 and a second horizontal edge coupling the readout bit at F4 to a data bit at G4. Thus, the data bits at D4 and G4 are also target data bits of the stabilizer measurement and are said to be "horizontally-aligned" with the check bit at F4 because the three bits occupy the same row in the product graph 800.

In sum, an example X-basis stabilizer measurement (explained below) has a readout bit at F4 and target data bits at F6, D4 and G4. This stabilizer measurement is effected by way of the following operations:

(1) Prepare the readout bit (e.g., F4) in a known state;

(2) Prepare a row-based stabilizer support group (cat state) that includes at least one qubit that is a nearest-neighbor to the readout bit (e.g., a nearest neighbor to F4) and at least one qubit that is a nearest neighbor to each of the target data qubits of the stabilizer measurement that are horizontally-aligned (e.g., D4, G4) with the readout bit (e.g., F4);

(3) Prepare a row-based measurement gadget: for each one of the target data qubits of the stabilizer measurement that are horizontally-aligned (e.g., D4, G4) with the readout bit (e.g., F4), apply a CNOT operation on the target data qubit (e.g., D4 or G4) while using a neighboring bridge ancilla in the row-based stabilizer support group (e.g., bridge ancillas 832 or 834) as the control, thereby entangling the target data bit with the row-based stabilizer support group;

(4) Prepare a column-based stabilizer support group (cat state) that includes at least one qubit that is a nearest-neighbor to the readout bit (e.g., F4) and at least one qubit that is a nearest neighbor to each of the target data qubits of the stabilizer measurement that are vertically-aligned (e.g., F6) with the readout bit (e.g., F4);

(5) Prepare a column-based measurement gadget: For each one of the target data qubits that are vertically-aligned (e.g., F6) with the readout bit (e.g., F4), apply a CNOT operation that targets the target data qubit (e.g., F6) while using a neighboring bridge ancilla in the column-based stabilizer support group (e.g., bridge ancilla 830) as the control, thereby entangling the target data bit with the row-based stabilizer support group;

(6) perform an X-basis measurement of the readout bit (e.g., F4), thereby destroying its data and extracting a syndrome bit (1 or 0) representing the parity of the target data qubits (e.g., D4, G4, and F6).

The above steps and following disclosure uses terminology that is, for clarity, further defined below:

The term "row-based stabilizer support group" is used herein to refer to a cat state that is formed along a row of bridge ancilla qubits that correspond to horizontal edges of the readout bit (F4) in the product graph 800. In the example shown, a row-based stabilizer support group 819 includes four bridge ancilla qubits shown connected by a horizontal line spanning the same coordinate space as the horizontal edges 818 and 820. The row-based stabilizer support group 819 is formed by entangling the four associated bridge ancillas in any suitable manner, such as by a sequence of multi-qubit measurements similar to those shown in FIG. 4.

In contrast to a row-based stabilizer support group, a row-based measurement gadget refers to a row-based stabilizer support group that has been entangled with the subset of target data qubits horizontally-aligned with the readout qubit. Stated differently, a row-based measurement gadget is formed via the combination of operations 2 and 3, above.

The term "column-based stabilizer support group" refers to a cat state that is formed along a column of bridge ancilla qubits that correspond to vertical edges of the readout bit (F4) in the product graph 800. In the example shown, the column-based stabilizer support group 822 includes three bridge ancilla qubits shown connected by a vertical line corresponding to the vertical edge 824. The column-based stabilizer support group 824 is formed by entangling the three associated bridge ancillas in any suitable manner, such as by a sequence of multi-qubit measurements similar to those shown in FIG. 4.

In contrast to a column-based stabilizer support group, a column-based measurement gadget refers to a column-based stabilizer support group that has been entangled with the subset of target data qubits vertically-aligned with the readout qubit. Stated differently, a column-based measurement gadget is formed via the combination of operations 4 and 5, above.

In other implementations, a subcircuit providing the functionality of the circuit described above (with respect to steps 1-6) includes one or more alternative 2-qubit gates in lieu of each CNOT. For example, the functionality of the "CNOT" gate could be implemented by a control-Z gate or a joint measurement.

Notably, any stabilizer in the product graph 800 can be individually measured via the above-enumerated operations. However, extracting a syndrome from the measurement circuit corresponding to the product graph 800 entails a sequence of measurements that provides for measuring all x-basis and z-basis stabilizers in the product graph 800.

One challenge in measuring all stabilizers in the product code graph arises from the extensive number of operations this task entails. Performing all stabilizer operations sequentially (e.g., each stabilizer—one by one) results in a circuit of considerable depth that is not efficient to implement. While it is possible to perform some of the operations for different stabilizers in parallel, it is important to ensure that there is no cross-entanglement of data qubits associated with different stabilizers.

Below, FIGS. 8B and 8C extend the example of FIG. 8A to further propose a syndrome extraction methodology that aims to construct as many of the column-based and row-based measurement gadgets in parallel as possible.

FIG. 8B illustrates a first set of exemplary operations 838 performed by a short-depth syndrome extraction circuit to measure a syndrome of the circuit represented by the product graph 800 of FIG. 8A. By example and without limitation, the product graph 800 is assumed to be identical in construction and implementation to the HPG code product graph described above with respect to FIG. 8A. As in FIG. 8A, Z-basis checks and a majority of the edges are omitted for simplicity of illustration.

Each stabilizer in the product graph 800 is defined by the existence of a check bit (either X-basis or Z-basis) in the product graph 800 and its associated edges identifying target data qubits of the stabilizer. Using the bridge ancilla qubits discussed above with respect to FIGS. 7B and 8A, column-based and row-based measurement gadgets can be constructed and used to copy the total parity of a set of target data qubits to a readout qubit. To accomplish the forgoing in a minimum-depth circuit implementation, the measurement circuit and associated product graph 800 is split into two subcircuits—one for the X stabilizers and one for the Z stabilizers.

For example, all X stabilizers are measured first and all Z stabilizers are measured second. Within these 2 subcircuits, the stabilizers may be measured in parallel when the following constructs are adhered to. The measurement of a single stabilizer is split into the steps outlined with respect to FIG. 8A, above which are reiterated below in an abbreviated form that is intended to be logically equivalent. Thus, for each one of the X stabilizers, the following steps are implemented:

(1) Prepare the stabilizer's readout qubit;
(2) Prepare a row-based measurement gadget that copies the parity of the target data qubits in the stabilizer's support which are in the same row as the readout qubit;
(3) Prepare a column-based measurement gadget that copies the parity of the target data qubits in the stabilizer's support which are in the same column as the readout qubit;
(4) Measure the readout qubit.

The herein proposed short-depth syndrome extraction circuit provides for generating as many of the row-based measurement gadgets in parallel as possible without inadvertently entangling any one data qubit with more than one check qubit.

According to one implementation, the forgoing is achieved by a complete X-basis syndrome measurement circuit including the following operations:

(1) prepare all X-basis checks qubits in a known state (e.g., the |x> state);
(2) Loop through each individual column:
   a. If any x-basis check qubits exist in the currently-selected column, concurrently prepare horizontal aspects of the stabilizer measurement associated with each of the x-basis qubits in the column. This may entail concurrent execution of (i) and (ii) below with respect to each x-basis check qubit in the selected column:
     i. preparing a row-based stabilizer group (cat state) using a line of bridge ancilla qubits that correspond to horizontal edges of each of the X-basis check qubits in the column; and
     ii. preparing a row-based measurement gadget for each row-based stabilizer support group by applying a CNOT or other suitable entanglement operation to a first set of target data qubits coupled to the x-basis check bit in each row by a horizontal edge, thereby entangling the first set of target data qubits with the row-based stabilizer support group;
(3) Loop through each individual row;
   a. If any x-basis check qubits exist in the currently-selected row, concurrently prepare vertical aspects of the stabilizer measurement associated with each of the x-basis qubits in the row. This may entail concurrent execution of (i) and (ii) below with respect to each x-basis check qubit in the selected row;

i. preparing a column-based stabilizer group (cat state) using a line of bridge ancilla qubits that correspond to horizontal edges of each of the X-basis check qubits in the row; and ii. preparing a row-based measurement gadget for each column-based stabilizer support group formed in by applying a CNOT or other suitable entanglement operation to a second set of target data qubits coupled to the x-basis check bit in each column by a vertical edge, thereby entangling the second set of target data qubits with the row-based stabilizer support group;

(4) Measure all of the X-basis check qubits in the quantum circuit and readout the measurement as the syndrome.

By example and without limitation, FIG. 8B illustrates preparation of row-based measurement gadgets for a set of X-basis check bits (readout bits) shown in column "B" of the product graph 800. This corresponds to the operations that performed in step (2) above where the selected column is "B." At step 2(a)(i), cat states are created along each of the illustrated bolded horizontal rows consisting of 5 bridge ancilla qubits (spanning coordinate space of horizontal edges 840, 842, 844) and, at step 2(a)(ii) a set of target data qubits in columns A, C, and E (e.g., forming endpoints of edges corresponding to edges 840, 842, and 848) are entangled with cat state that has been created for the associated stabilizer.

Although not illustrated, it is implied that the above process continues, looping through each column to identify additional x-basis check bits and to repeatedly perform steps 2(a)(i) and 2(a)(ii) above with respect to remaining columns B-F. Columns C, D, and E do not have any x-basis check bits; however, column F does. Thus, upon reaching column F in step (2) above, another group of row-based measurement gadgets is created for the stabilizers associated with the check bits in column F.

FIG. 8C illustrates another set of exemplary operations 850 performed by a short-depth syndrome extraction circuit to measure a syndrome of the circuit represented by the product graph 800 of FIGS. 8A and 8B. Specifically, FIG. 8C illustrates preparation of column-based measurement gadgets for a set of X-basis check bits (readout bits) shown in row (1) of the product graph 800. This corresponds to the operations that performed in step (2) above where the selected column is "1." At step 3(a)(i), cat states are created along each of the illustrated bolded horizontal columns consisting of 3 bridge ancilla qubits (spanning coordinate space of the vertical edge 848) and, at step 2(a)(ii) a target data qubit in row 3 (e.g., forming an endpoint of an edge corresponding to the edge 840) is entangled with cat state that has been created for the associated stabilizer.

Although not illustrated, it is implied that the above process continues, looping through each row to identify additional x-basis check bits and to repeatedly perform steps 3(a)(i) and 3(a)(2) above with respect to each of rows 7-8.

The above-described sequence of operations allows for implementation of any hypergraph product code in a 2D circuit and for implementing a syndrome measurement circuit to measure the syndrome of the 2D circuit, where the syndrome measurement circuit is guaranteed to have a depth less than or equal to a (constant) ($\sqrt{n}$), where n is the number of data qubits in the 2D circuit, when using (constant)n ancilla qubits. This finding is set forth by the proposition and proof below in Table 2.0, below:

TABLE 2.0

Local HPG Short-Depth Syndrome Extraction Circuit: Consider an HPG code with $r^2$ vertices and with qubits placed at standard integer co-ordinates, along with ancilla qubits placed at half-integer coordinates. We split the X and Z stabilizer generators into two subcircuits. For each column, we prepare the X readout ancilla qubits in the column in a first time step and, in parallel for each of them, we apply a row measurement-based gadget. Then, for each row, we apply in parallel a column measure-based gadget for each X readout ancilla qubits in that row followed by a measurement of the readout qubits. We do the same for the Z readout qubits. This circuit has optimal depth up to a multiplicative constant for any local syndrome extraction circuit of an HPG code with a Tanner graph that exhibits expansion, from the lower bound and the following proposition.

Proposition: For a code with length N and $M\tilde{A} \sim N$ stabilizer generators, the Local HPG Short-Depth Syndrome Extraction Circuit has depth proportional to $\sqrt{N}$.

Proof Measurement-based gadgets have a depth of 5 and there is a total of 2M gadgets in the circuit. In each parallel block, we apply $c\sqrt{N}$ gadgets in parallel for some constant $< c < 1$. Thus, depth is the of the circuit proportional to $\frac{2M}{c\sqrt{N}} \sim \sqrt{N}$.

The above process generally indicates that time to execute the syndrome extraction circuit provided by FIG. 8A-8C does not linearly along with the length of the code, as it does with other competing syndrome extraction circuit architectures. Rather, circuit depth is capped to an optimal level proportional to $\sqrt{N}$.

Figure 9:
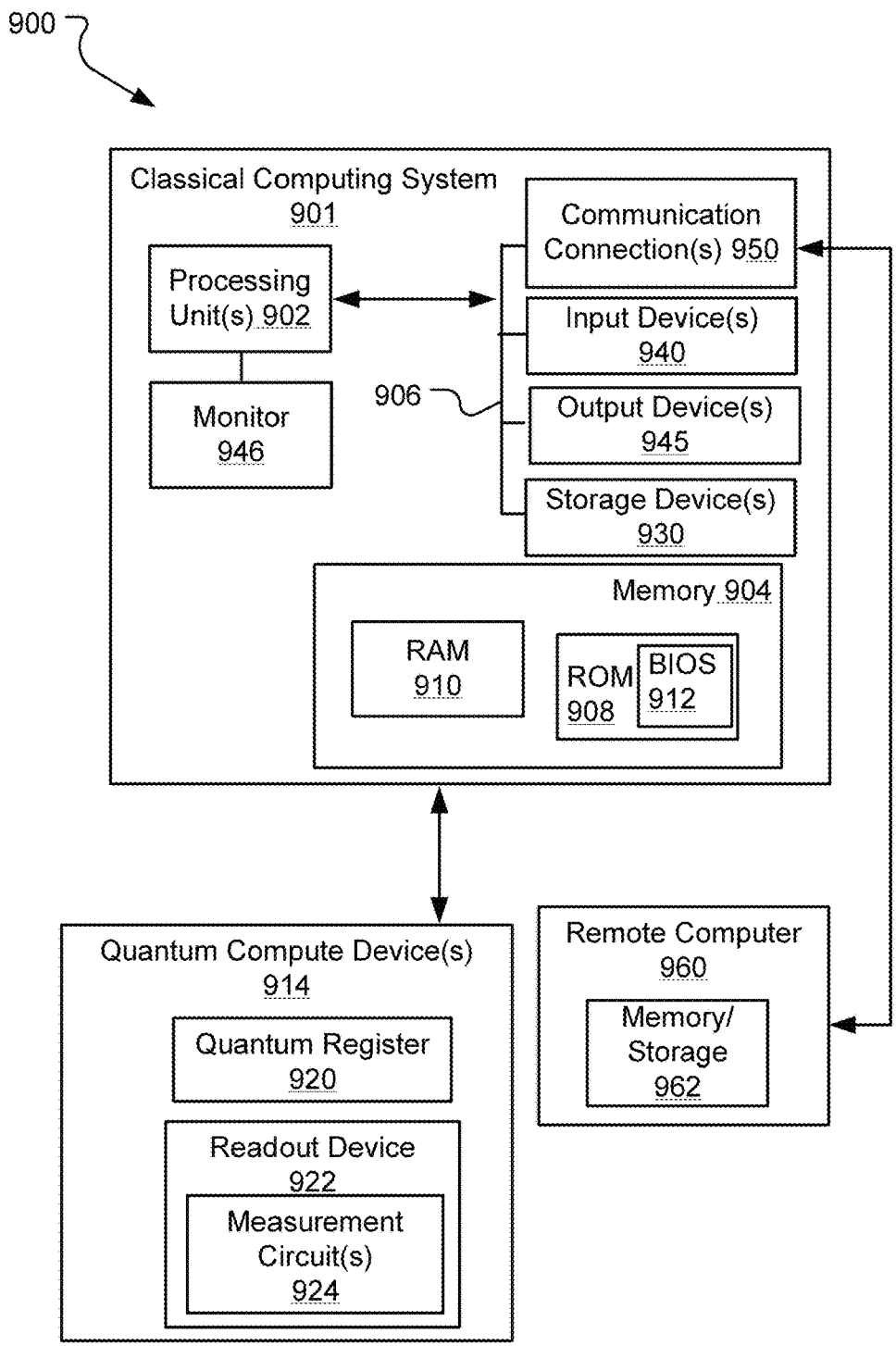
FIG. 9 illustrates an exemplary computing environment suitable for implementing aspects of the disclosed technology.

FIG. 9 illustrates an exemplary computing environment 900 suitable for implementing aspects of the disclosed technology. This figure and the following discussion are intended to provide a brief, general description of an exemplary computing environment in which the disclosed technology may be implemented. Although not required, the disclosed technology is described in the general context of computer executable instructions, such as program modules, being executed by a personal computer (PC). Generally, program modules include routines, programs, objects, components, data structures, etc., that perform particular tasks or implement particular abstract data types. Moreover, the disclosed technology may be implemented with other computer system configurations, including hand held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

The computing environment 900 of FIG. 9 includes a classical computing environment 901 (e.g., a PC) coupled to one or more quantum compute device(s) 914. The quantum compute devices 914 includes at least a quantum register 920 and a readout device 922 including quantum hardware implementing measurement circuits 924. Aspects of the quantum compute devices 914 may be controlled by hardware and software elements of the classical computing system 901.

In one implementation, the classical computing system 901 includes one or more processing units 902, a system memory 904, and a system bus 906 that couples various system components including the system memory 904 to the one or more processing units 902. The system bus 906 may be any of several types of bus structures including a memory bus or memory controller, a peripheral bus, and a local bus using any of a variety of bus architectures. The exemplary system memory 1104 includes read only memory (ROM) 908 and random access memory (RAM) 910. A basic input/output system (BIOS) 912, containing the basic routines that help with the transfer of information between elements within the classical computing system 901 is stored in the ROM 908.

In one implementation, the system memory 904 stores short-depth syndrome extraction logic 120 of FIG. 1 and also stores decoding logic for detecting and correcting errors in measurement data using syndromes extracted by executing the short-depth syndrome extraction logic.

The classical computing system 901 further includes one or more storage devices 930 such as a hard disk drive for reading from and writing to a hard disk, a magnetic disk drive for reading from or writing to a removable magnetic disk, and an optical disk drive for reading from or writing to a removable optical disk (such as a CD-ROM or other optical media). Such storage devices can be connected to the system bus 906 by a hard disk drive interface, a magnetic disk drive interface, and an optical drive interface, respectively. The drives and their associated computer readable media provide nonvolatile storage of computer-readable instructions, data structures, program modules, and other data for the classical computing system 901. Other types of computer-readable media which can store data that is accessible by a PC, such as magnetic cassettes, flash memory cards, digital video disks, CDs, DVDs, RAMs, ROMs, and the like, may also be used in the exemplary operating environment.

A number of program modules may be stored in the storage devices 930 including an operating system, one or more application programs, other program modules, and program data. A user may enter commands and information into the classical computing system 901 through one or more input devices 940 such as a keyboard and a pointing device such as a mouse. Other input devices may include a digital camera, microphone, joystick, game pad, satellite dish, scanner, or the like. These and other input devices are often connected to the one or more processing units 902 through a serial port interface that is coupled to the system bus 906, but may be connected by other interfaces such as a parallel port, game port, or universal serial bus (USB). A monitor 1146 or other type of display device is also connected to the system bus 906 via an interface, such as a video adapter. Other peripheral output devices 945, such as speakers and printers (not shown), may be included.

The classical computing system 901 may operate in a networked environment using logical connections to one or more remote computers, such as a remote computer 960. In some examples, one or more network or communication connections 950 are included. The remote computer 960 may be another PC, a server, a router, a network PC, or a peer device or other common network node, and typically includes many or all of the elements described above, although only a memory storage device 962 has been illustrated in FIG. 9. The classical computing system 901 and/or the remote computer 960 can be connected to a logical a local area network (LAN) and a wide area network (WAN). Such networking environments are commonplace in offices, enterprise wide computer networks, intranets, and the Internet.

When used in a LAN networking environment, the classical computing system 901 is connected to the LAN through a network interface. When used in a WAN networking environment, the classical computing system 901 typically includes a modem or other means for establishing communications over the WAN, such as the Internet. In a networked environment, program modules depicted relative to the classical computing system 901, or portions thereof, may be stored in the remote memory storage device or other locations on the LAN or WAN. The network connections shown are exemplary, and other means of establishing a communications link between the computers may be used.

The classical computing system 901 may include a variety of tangible computer-readable storage media and intangible computer-readable communication signals. Tangible computer-readable storage can be embodied by any available media that can be accessed by the classical computing system 901 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the classical computing system 901. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

An example method disclosed herein provides for extracting a syndrome from a quantum measurement circuit implementing a hypergraph product code (HPG). The method includes preparing a readout qubit of the quantum measurement circuit in a known state, the readout qubit corresponding to a check qubit in the hypergraph product (HPG) code that is used in a stabilizer measurement to measure parity of an associated target set of data qubits. The method further includes preparing a row-based measurement gadget in the quantum measurement circuit and for preparing a column-based measurement gadget in the quantum measurement circuit, where the row-based measurement gadget entangles the readout qubit with a first subset of the target set of data qubits in a same row of the quantum measurement circuit as the readout qubit and the column-based measurement gadget entangles the readout qubit with a second subset of the target set of data qubits in a same column of the quantum measurement circuit as the readout qubit. Finally, the method provides for measuring the readout qubit to extract the parity of the target set of data qubits.

In another example method of any preceding method, preparing the row-based measurement gadget further comprises forming a cat state of a row of bridge ancilla qubits. The row of bridge ancilla qubits includes a least one ancilla qubit that is a nearest-neighbor qubit to the readout qubit and at least one ancilla qubit that is a nearest-neighbor to each of the data qubits in the first subset of the target set of data qubits. The method provides for entangling the data qubits in the first subset with the cat state.

In still another example method of any preceding method, preparing the column-based measurement gadget further comprises forming a cat state of a column of bridge ancilla qubits. The column of bridge ancilla qubits includes a least one ancilla qubit that is a nearest-neighbor qubit to the readout qubit and at least one ancilla qubit that is a nearest-neighbor to each of the data qubits in the second subset of the target set of data qubits. The method further provides for entangling the data qubits in the second subset with the cat state.

In yet still another example method of any preceding method, the method further provides for concurrently preparing a plurality of readout qubits in the known state. Each one of the readout qubits corresponds to a check qubit in the HPG code that is used to measure parity of an associated target set of data qubits.

In still yet another method of any preceding method, the method further provides for preparing a plurality of a row-based measurement gadgets and preparing a plurality of a column-based measurement gadgets. Each one of the row-based measurement gadgets entangles an associated readout qubit of the plurality of readout qubits with a first subset of an associated target set of data qubits in a same row of the quantum measurement circuit as the readout qubit, and each one of the column-based measurement gadgets entangles an associated readout qubit of the plurality of readout qubits with a second subset of an associated target set of data qubits in a same column of the quantum measurement circuit as the readout qubit. The method further provides for concurrently measuring the plurality of readout qubits.

In yet still another example method of any preceding method, the plurality of readout qubits concurrently prepared in the known state consists of X-basis check qubits. The method further comprises concurrently preparing a plurality of Z-basis readout qubits in the known state, where each one of the Z-basis readout qubits corresponds to a Z-basis check qubit in the HPG code that is used to measure parity of an associated target set of data qubits. In addition, the method includes preparing a plurality of a row-based measurement gadgets and a plurality of a column-based measurement gadgets. Each one of the row-based measurement gadgets entangles an associated Z-basis readout qubit of the plurality of Z-basis readout qubits with a first subset of an associated target set of data qubits in a same row of the quantum measurement circuit as the Z-basis readout qubit, and each one of the column-based measurement gadgets entangles an associated Z-basis readout qubit of the plurality of Z-basis readout qubits with a second subset of an associated target set of data qubits in a same column of the quantum measurement circuit as the Z-basis readout qubit. The method further provides for concurrently measuring the plurality of Z-basis readout qubits.

In yet another example method of any preceding method, the method further comprises representing a first linear code as a first Tanner graph and a second linear code as a second Tanner graph; calculating a product of all nodes in the first Tanner graph and the second Tanner graph to generate a 2D graph of the HPG code, and defining graph edges in 2D graph by propagating edges of the first linear code to every column in the 2D graph and by propagating edges of the second linear code to every row in the 2D graph; adding a grid of ancilla qubits to in the 2D graph, the grid including an ancilla qubit between each pair of adjacent vertices in the 2D graph; and implementing the in the 2D graph of the hypergraph code in the quantum measurement circuit.

In yet still another example method of any preceding method, the quantum measurement circuit includes a 2D grid of qubits providing local connectivity between pairs of nearest-neighbor qubits.

An example quantum system disclosed herein includes a quantum measurement circuit implementing a hypergraph product (HPG) code and a controller configured to measure a stabilizer of the HPG code. To measure the stabilizer, the controller performs actions that include preparing a readout qubit of the quantum measurement circuit in a known state. The readout qubit corresponds to a check qubit in the hypergraph product (HPG) code that is used in a stabilizer measurement to measure parity of an associated target set of data qubits. The controller prepares a row-based measurement gadget in the quantum measurement circuit and a column-based measurement gadget in the quantum measurement circuit. The row-based measurement gadget entangles the readout qubit with a first subset of the target set of data qubits in a same row of the quantum measurement circuit as the readout qubit, and the column-based measurement gadget entangles the readout qubit with a second subset of the target set of data qubits in a same column of the quantum measurement circuit as the readout qubit. The controller measures the readout qubit to extract the parity of the target set of data qubits.

In yet another example quantum system of any preceding system, the controller is further configured to prepare the row-based measurement gadget by forming a cat state of a row of bridge ancilla qubits, and by entangling the data qubits in the first subset with the cat state. The row of bridge ancilla qubits includes a least one ancilla qubit that is a nearest-neighbor qubit to the readout qubit and at least one ancilla qubit that is a nearest-neighbor to each of the data qubits in the first subset of the target set of data qubits.

In another example system of any preceding quantum system, the controller is further configured to prepare the column-based measurement gadget by forming a cat state of a column of bridge ancilla qubits. The column of bridge ancilla qubits includes a least one ancilla qubit that is a nearest-neighbor qubit to the readout qubit and at least one ancilla qubit that is a nearest neighbor to each of the data qubits in the second subset of the target set of data qubits. The controller entangles the data qubits in the second subset with the cat state.

In another example system of any preceding system, the controller is further configured to concurrently preparing a plurality of readout qubits in the known state, each one of the readout qubits corresponding to a check qubit in the HPG code that is used to measure parity of an associated target set of data qubits. The controller prepares a plurality of a row-based measurement gadgets and a plurality of a column-based measurement gadgets. Each one of the row-based measurement gadgets entangles an associated readout qubit of the plurality of readout qubits with a first subset of an associated target set of data qubits in a same row of the quantum measurement circuit as the readout qubit, and each one of the column-based measurement gadgets entangles an associated readout qubit of the plurality of readout qubits with a second subset of an associated target set of data qubits in a same column of the quantum measurement circuit as the readout qubit. The controller concurrently measures the plurality of readout qubits.

In another example system of any preceding system, plurality of readout qubits concurrently prepared in the known state consists of X-basis check qubits and the controller is further configured to concurrently prepare a plurality of Z-basis readout qubits in the known state, each one of the Z-basis readout qubits corresponding to a Z-basis check qubit in the HPG code that is used to measure parity of an associated target set of data qubits. The controller prepares a plurality of a row-based measurement gadgets, and a plurality of a column-based measurement gadgets. Each one of the row-based measurement gadgets entangles an associated Z-basis readout qubit of the plurality of Z-basis readout qubits with a first subset of an associated target set of data qubits in a same row of the quantum measurement circuit as the Z-basis readout qubit, and each one of the column-based measurement gadgets entangles an associated Z-basis readout qubit of the plurality of Z-basis readout qubits with a second subset of an associated target set of data qubits in a same column of the quantum measurement circuit as the Z-basis readout qubit. The controller concurrently measures the plurality of Z-basis readout qubits.

In yet another example quantum system of any preceding system, the controller is further configured to represent a first linear code as a first Tanner graph and a second linear code as a second Tanner graph; calculate a product of all vertices in the first Tanner graph and the second Tanner graph to generate a 2D graph of the HPG code; define graph edges in 2D graph by propagating edges of the first linear code to every column in the 2D graph and by propagating edges of the second linear code to every row in the 2D graph; add a grid of ancilla qubits to in the 2D graph, the grid including an ancilla qubit between each pair of adjacent vertices in the 2D graph; and logically implement the 2D graph of the hypergraph code in the quantum measurement circuit.

In another example system of any preceding system, the quantum measurement circuit includes a 2D grid of qubits providing local connectivity between pairs of nearest-neighbor qubits.

An example tangible computer-readable storage media disclosed herein stores computer-executable instructions for executing a computer process that includes controlling a quantum measurement circuit to prepare a readout qubit of the quantum measurement circuit in a known state, the readout qubit corresponding to a check qubit in a hypergraph product (HPG) code that is used in a stabilizer measurement to measure parity of an associated target set of data qubits. The computer process further includes controlling the quantum measurement circuit to prepare a row-based measurement gadget in the quantum measurement circuit and to prepare a column-based measurement gadget in the quantum measurement circuit. The row-based measurement gadget entangles the readout qubit with a first subset of the target set of data qubits in a same row of the quantum measurement circuit as the readout qubit, and the column-based measurement gadget entangles the readout qubit with a second subset of the target set of data qubits in a same column of the quantum measurement circuit as the readout qubit. The computer process further provides for measuring the readout qubit to extract the parity of the target set of data qubits.

In another tangible computer-readable storage media according to any preceding computer-readable storage media, the encoded computer process further provides for preparing the row-based measurement gadget by forming a cat state of a row of bridge ancilla qubits and entangling the data qubits in the first subset with the cat state. The row of bridge ancilla qubits includes a least one ancilla qubit that is a nearest-neighbor qubit to the readout qubit and at least one ancilla qubit that is a nearest-neighbor to each of the data qubits in the first subset of the target set of data qubits.

In another tangible computer-readable storage media according to any preceding computer-readable storage media, the encoded computer process further provides for preparing the column-based measurement gadget by forming a cat state of a column of bridge ancilla qubits and entangling the data qubits in the second subset with the cat state. The column of bridge ancilla qubits includes a least one ancilla qubit that is a nearest-neighbor qubit to the readout qubit and at least one ancilla qubit that is a nearest-neighbor to each of the data qubits in the second subset of the target set of data qubits.

In another tangible computer-readable storage media according to any preceding computer-readable storage media, the encoded computer process further provides for controlling the quantum measurement circuit to concurrently prepare a plurality of readout qubits in the known state, each one of the readout qubits corresponding to a check qubit in the HPG code that is used to measure parity of an associated target set of data qubits. The computer process further provides for controlling the quantum measurement circuit to prepare a plurality of a row-based measurement gadgets and for controlling the quantum measurement circuit to prepare a plurality of a column-based measurement gadgets. Each one of the row-based measurement gadgets entangles an associated readout qubit of the plurality of readout qubits with a first subset of an associated target set of data qubits in a same row of the quantum measurement circuit as the readout qubit, and each one of the column-based measurement gadgets entangles an associated readout qubit of the plurality of readout qubits with a second subset of an associated target set of data qubits in a same column of the quantum measurement circuit as the readout qubit. The computer process further provides for concurrently measuring the plurality of readout qubits.

In still another tangible computer-readable storage media according to any preceding computer-readable storage media, the plurality of readout qubits concurrently prepared in the known state consists of X-basis check qubits and the computer process further provides for controlling the quantum measurement circuit to concurrently prepare a plurality of Z-basis readout qubits in the known state, where each one of the Z-basis readout qubits corresponding to a Z-basis check qubit in the HPG code that is used to measure parity of an associated target set of data qubits. The computer process further provides for controlling the quantum measurement circuit to prepare a plurality of a row-based measurement gadgets and controlling the quantum measurement circuit to prepare a plurality of a column-based measurement gadgets. Each one of the row-based measurement gadgets entangles an associated Z-basis readout qubit of the plurality of Z-basis readout qubits with a first subset of an associated target set of data qubits in a same row of the quantum measurement circuit as the Z-basis readout qubit, and each one of the column-based measurement gadgets entangles an associated Z-basis readout qubit of the plurality of Z-basis readout qubits with a second subset of an associated target set of data qubits in a same column of the quantum measurement circuit as the Z-basis readout qubit. The computer process further provides for concurrently measuring the plurality of Z-basis readout qubits.

In yet another tangible computer-readable storage media according to any preceding computer-readable storage media, the encoded computer process further provides for determining a first graph representing a first linear code; determining a second graph representing a second linear code, and generating a 2D graph of the HPG code. Generation of the 2D graph further includes: calculating a product of all vertices in the first graph and the second graph; defining edges in 2D graph by propagating edges of the first linear code to every column in the 2D graph and by propagating edges of the second linear code to every row in the 2D graph; adding a grid of ancilla qubits to in the 2D graph, the grid including an ancilla qubit between each pair of adjacent vertices in the 2D graph; and implementing the in the 2D graph of the HPG code in the quantum measurement circuit.

An example system disclosed herein is configured to extract syndrome from a quantum measurement circuit implementing a hypergraph product code (HPG). The system includes a means for preparing a readout qubit of the quantum measurement circuit in a known state, where the readout qubit corresponds to a check qubit in the hypergraph product (HPG) code that is used in a stabilizer measurement to measure parity of an associated target set of data qubits. The system further includes a means for preparing a row-based measurement gadget in the quantum measurement circuit and a means for preparing a column-based measurement gadget in the quantum measurement circuit. The row-based measurement gadget entangles the readout qubit with a first subset of the target set of data qubits in a same row of the quantum measurement circuit as the readout qubit, and the column-based measurement gadget entangles the readout qubit with a second subset of the target set of data qubits in a same column of the quantum measurement circuit as the readout qubit. The system further includes a means for measuring the readout qubit to extract the parity of the target set of data qubits.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendix, provide a complete description of the structure and use of exemplary implementations.

The above specification, examples, together with the attached appendix provide a complete description of the structure and use of exemplary implementations. Since many implementations can be made without departing from the spirit and scope of the claimed invention, the claims hereinafter appended define the invention. Furthermore, structural features of the different examples may be combined in yet another implementation without departing from the recited claims. The above specification, examples, and data provide a complete description of the structure and use of exemplary implementations. Since many implementations can be made without departing from the spirit and scope of the claimed invention, the claims hereinafter appended define the invention. Furthermore, structural features of the different examples may be combined in yet another implementation without departing from the recited claims.

What is claimed is:

1. A method for extracting a syndrome from a quantum measurement circuit implementing a hypergraph product code (HPG), the method comprising:
    preparing a readout qubit of the quantum measurement circuit in a known state, the readout qubit corresponding to a check qubit in the hypergraph product (HPG) code that is used in a stabilizer measurement to measure parity of an associated target set of data qubits;
    prepare a row-based measurement gadget in the quantum measurement circuit by operations that include:
        forming a cat state of a row of bridge ancilla qubits, the row of bridge ancilla qubits including a least one ancilla qubit that is a nearest-neighbor qubit to the readout qubit and at least one ancilla qubit that is a nearest-neighbor to each of the data qubits in a first subset of the target set of data qubits; and
        entangling the cat state with the first subset of the target set of data qubits in a same row of the quantum measurement circuit as the readout qubit;
    prepare a column-based measurement gadget in the quantum measurement circuit, the column-based measurement gadget entangling the readout qubit with a second subset of the target set of data qubits in a same column of the quantum measurement circuit as the readout qubit; and
    measuring the readout qubit to extract the parity of the target set of data qubits.

2. The method of claim 1, wherein preparing the column-based measurement gadget further comprises:
    forming a cat state of a column of bridge ancilla qubits, the column of bridge ancilla qubits including a least one ancilla qubit that is a nearest-neighbor qubit to the readout qubit and at least one ancilla qubit that is a nearest-neighbor to each of the data qubits in the second subset of the target set of data qubits;
    entangling the data qubits in the second subset with the cat state.

3. The method of claim 1, further comprising:
    concurrently preparing a plurality of readout qubits in the known state, each one of the readout qubits corresponding to a check qubit in the HPG code that is used to measure parity of an associated target set of data qubits;
    preparing a plurality of a row-based measurement gadgets, each one of the row-based measurement gadgets entangling an associated readout qubit of the plurality of readout qubits with a first subset of an associated target set of data qubits in a same row of the quantum measurement circuit as the readout qubit;
    preparing a plurality of a column-based measurement gadgets, each one of the column-based measurement gadgets entangling an associated readout qubit of the plurality of readout qubits with a second subset of an associated target set of data qubits in a same column of the quantum measurement circuit as the readout qubit; and concurrently measuring the plurality of readout qubits.

4. The method of claim 3, wherein the plurality of readout qubits concurrently prepared in the known state consists of X-basis check qubits and the method further comprises:

concurrently preparing a plurality of Z-basis readout qubits in the known state, each one of the Z-basis readout qubits corresponding to a Z-basis check qubit in the HPG code that is used to measure parity of an associated target set of data qubits;

preparing a plurality of a row-based measurement gadgets, each one of the row-based measurement gadgets entangling an associated Z-basis readout qubit of the plurality of Z-basis readout qubits with a first subset of an associated target set of data qubits in a same row of the quantum measurement circuit as the Z-basis readout qubit;

preparing a plurality of a column-based measurement gadgets, each one of the column-based measurement gadgets entangling an associated Z-basis readout qubit of the plurality of Z-basis readout qubits with a second subset of an associated target set of data qubits in a same column of the quantum measurement circuit as the Z-basis readout qubit; and concurrently measuring the plurality of Z-basis readout qubits.

5. The method of claim 1, further comprising:

representing a first linear code as a first Tanner graph and a second linear code as a second Tanner graph;

calculating a product of all nodes in the first Tanner graph and the second Tanner graph to generate a 2D graph of the HPG code;

defining graph edges in 2D graph by propagating edges of the first linear code to every column in the 2D graph and by propagating edges of the second linear code to every row in the 2D graph;

adding a grid of ancilla qubits to in the 2D graph, the grid including an ancilla qubit between each pair of adjacent vertices in the 2D graph; and implementing the in the 2D graph of the hypergraph code in the quantum measurement circuit.

6. The method of claim 1, wherein the quantum measurement circuit includes a 2D grid of qubits providing local connectivity between pairs of nearest-neighbor qubits.

7. A quantum system comprising:

a quantum measurement circuit implementing a hypergraph product (HPG) code;

a controller configured to measure a stabilizer of the HPG code, the measurement of the stabilizer including:

preparing a readout qubit of the quantum measurement circuit in a known state, the readout qubit corresponding to a check qubit in the hypergraph product (HPG) code that is used in a stabilizer measurement to measure parity of an associated target set of data qubits;

preparing a row-based measurement gadget in the quantum measurement circuit by operations that include:

forming a cat state of a row of bridge ancilla qubits, the row of bridge ancilla qubits including a least one ancilla qubit that is a nearest-neighbor qubit to the readout qubit and at least one ancilla qubit that is a nearest-neighbor to each of the data qubits in a first subset of the target set of data qubits; and entangling the cat state with the first subset of the target set of data qubits in a same row of the quantum measurement circuit as the readout qubit;

preparing a column-based measurement gadget in the quantum measurement circuit, the column-based measurement gadget entangling the readout qubit with a second subset of the target set of data qubits in a same column of the quantum measurement circuit as the readout qubit; and measuring the readout qubit to extract the parity of the target set of data qubits.

8. The quantum system of claim 7, wherein the controller is further configured to prepare the column-based measurement gadget by:

forming a cat state of a column of bridge ancilla qubits, the column of bridge ancilla qubits including a least one ancilla qubit that is a nearest-neighbor qubit to the readout qubit and at least one ancilla qubit that is a nearest-neighbor to each of the data qubits in the second subset of the target set of data qubits;

entangling the data qubits in the second subset with the cat state.

9. The quantum system of claim 7, wherein the controller is further configured to extract a syndrome from the quantum measurement circuit, the extraction of the syndrome including:

concurrently preparing a plurality of readout qubits in the known state, each one of the readout qubits corresponding to a check qubit in the HPG code that is used to measure parity of an associated target set of data qubits;

preparing a plurality of a row-based measurement gadgets, each one of the row-based measurement gadgets entangling an associated readout qubit of the plurality of readout qubits with a first subset of an associated target set of data qubits in a same row of the quantum measurement circuit as the readout qubit;

preparing a plurality of a column-based measurement gadgets, each one of the column-based measurement gadgets entangling an associated readout qubit of the plurality of readout qubits with a second subset of an associated target set of data qubits in a same column of the quantum measurement circuit as the readout qubit; and concurrently measuring the plurality of readout qubits.

10. The quantum system of claim 9, wherein the plurality of readout qubits concurrently prepared in the known state consists of X-basis check qubits and the controller is further configured to:

concurrently prepare a plurality of Z-basis readout qubits in the known state, each one of the Z-basis readout qubits corresponding to a Z-basis check qubit in the HPG code that is used to measure parity of an associated target set of data qubits;

prepare a plurality of a row-based measurement gadgets, each one of the row-based measurement gadgets entangling an associated Z-basis readout qubit of the plurality of Z-basis readout qubits with a first subset of an associated target set of data qubits in a same row of the quantum measurement circuit as the Z-basis readout qubit;

prepare a plurality of a column-based measurement gadgets, each one of the column-based measurement gadgets entangling an associated Z-basis readout qubit of the plurality of Z-basis readout qubits with a second subset of an associated target set of data qubits in a same column of the quantum measurement circuit as the Z-basis readout qubit; and concurrently measure the plurality of Z-basis readout qubits.

11. The quantum system of claim 7, wherein the controller is further configured to:
represent a first linear code as a first Tanner graph and a second linear code as a second Tanner graph;
calculate a product of all vertices in the first Tanner graph and the second Tanner graph to generate a 2D graph of the HPG code;
define graph edges in 2D graph by propagating edges of the first linear code to every column in the 2D graph and by propagating edges of the second linear code to every row in the 2D graph;
add a grid of ancilla qubits to in the 2D graph, the grid including an ancilla qubit between each pair of adjacent vertices in the 2D graph; and
logically implement the 2D graph of the hypergraph code in the quantum measurement circuit.

12. The quantum system of claim 7, wherein the quantum measurement circuit includes a 2D grid of qubits providing local connectivity between pairs of nearest-neighbor qubits.

13. One or more tangible computer-readable storage media storing computer-executable instructions for executing a computer process, the computer process comprising:
controlling a quantum measurement circuit to prepare a readout qubit of the quantum measurement circuit in a known state, the readout qubit corresponding to a check qubit in a hypergraph product (HPG) code that is used in a stabilizer measurement to measure parity of an associated target set of data qubits;
controlling the quantum measurement circuit to prepare a row-based measurement gadget in the quantum measurement circuit by operations that include:
forming a cat state of a row of bridge ancilla qubits, the row of bridge ancilla qubits including a least one ancilla qubit that is a nearest-neighbor qubit to the readout qubit and at least one ancilla qubit that is a nearest-neighbor to each of the data qubits in a first subset of the target set of data qubits;
entangling the cat state the first subset of the target set of data qubits in a same row of the quantum measurement circuit as the readout qubit;
controlling the quantum measurement circuit prepare a column-based measurement gadget in the quantum measurement circuit, the column-based measurement gadget entangling the readout qubit with a second subset of the target set of data qubits in a same column of the quantum measurement circuit as the readout qubit; and
measuring the readout qubit to extract the parity of the target set of data qubits.

14. The one or more tangible computer-readable storage media of claim 13, wherein preparing the column-based measurement gadget further comprises:
forming a cat state of a column of bridge ancilla qubits, the column of bridge ancilla qubits including a least one ancilla qubit that is a nearest-neighbor qubit to the readout qubit and at least one ancilla qubit that is a nearest-neighbor to each of the data qubits in the second subset of the target set of data qubits;
entangling the data qubits in the second subset with the cat state.

15. The one or more tangible computer-readable storage media of claim 13, wherein the computer process further comprises:
controlling the quantum measurement circuit to concurrently prepare a plurality of readout qubits in the known state, each one of the readout qubits corresponding to a check qubit in the HPG code that is used to measure parity of an associated target set of data qubits;
controlling the quantum measurement circuit to prepare a plurality of a row-based measurement gadgets, each one of the row-based measurement gadgets entangling an associated readout qubit of the plurality of readout qubits with a first subset of an associated target set of data qubits in a same row of the quantum measurement circuit as the readout qubit;
controlling the quantum measurement circuit to prepare a plurality of a column-based measurement gadgets, each one of the column-based measurement gadgets entangling an associated readout qubit of the plurality of readout qubits with a second subset of an associated target set of data qubits in a same column of the quantum measurement circuit as the readout qubit; and
concurrently measuring the plurality of readout qubits.

16. The one or more tangible computer-readable storage media of claim 15, wherein the plurality of readout qubits concurrently prepared in the known state consists of X-basis check qubits and the computer process further comprises:
controlling the quantum measurement circuit to concurrently prepare a plurality of Z-basis readout qubits in the known state, each one of the Z-basis readout qubits corresponding to a Z-basis check qubit in the HPG code that is used to measure parity of an associated target set of data qubits;
controlling the quantum measurement circuit to prepare a plurality of a row-based measurement gadgets, each one of the row-based measurement gadgets entangling an associated Z-basis readout qubit of the plurality of Z-basis readout qubits with a first subset of an associated target set of data qubits in a same row of the quantum measurement circuit as the Z-basis readout qubit;
controlling the quantum measurement circuit to prepare a plurality of a column-based measurement gadgets, each one of the column-based measurement gadgets entangling an associated Z-basis readout qubit of the plurality of Z-basis readout qubits with a second subset of an associated target set of data qubits in a same column of the quantum measurement circuit as the Z-basis readout qubit; and
concurrently measuring the plurality of Z-basis readout qubits.

17. The one or more tangible computer-readable storage media of claim 13, wherein the computer process further comprises:
determining a first graph representing a first linear code;
determining a second graph representing a second linear code;
generating a 2D graph of the HPG code, the generation of the 2D graph further comprising:
calculating a product of all vertices in the first graph and the second graph;
defining edges in 2D graph by propagating edges of the first linear code to every column in the 2D graph and by propagating edges of the second linear code to every row in the 2D graph;
adding a grid of ancilla qubits to in the 2D graph, the grid including an ancilla qubit between each pair of adjacent vertices in the 2D graph; and
implementing the in the 2D graph of the HPG code in the quantum measurement circuit.

* * * * *